US008974756B2

(12) United States Patent
Martin

(10) Patent No.: US 8,974,756 B2
(45) Date of Patent: Mar. 10, 2015

(54) PROCESS TO ENHANCE MIXING OF DRY SORBENTS AND FLUE GAS FOR AIR POLLUTION CONTROL

(71) Applicant: ADA-ES, Inc., Highlands Ranch, CO (US)

(72) Inventor: Cameron E. Martin, Denver, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 0 days.

(21) Appl. No.: 13/951,167

(22) Filed: Jul. 25, 2013

(65) Prior Publication Data

US 2014/0030178 A1      Jan. 30, 2014

Related U.S. Application Data

(60) Provisional application No. 61/675,497, filed on Jul. 25, 2012, provisional application No. 61/809,717, filed on Apr. 8, 2013.

(51) Int. Cl.
*B01D 53/50* (2006.01)
*B01D 53/56* (2006.01)
(Continued)

(52) U.S. Cl.
CPC .............. *B01D 53/685* (2013.01); *B01D 53/64* (2013.01); *B01D 53/565* (2013.01); *B01D 53/508* (2013.01); *B01D 53/52* (2013.01); *B01D 53/40* (2013.01); *B01D 53/83* (2013.01); *Y02C 20/30* (2013.01); *B01D 2251/108* (2013.01);
(Continued)

(58) Field of Classification Search
CPC ............... B01D 53/10; B01D 53/1456; B01D 53/1481; B01D 53/508; B01D 53/565; B01D 53/64; B01D 53/685; B01D 53/81; B01D 53/83
USPC .............. 423/210, 220, 239.1, 240 S, 244.03, 423/244.07, 215.5; 422/168, 177
See application file for complete search history.

(56) References Cited

U.S. PATENT DOCUMENTS

| 174,348 A | 3/1876 | Brown |
| 202,092 A | 4/1878 | Breed |

(Continued)

FOREIGN PATENT DOCUMENTS

| AU | 2003/220713 | 2/2004 |
| CA | 1140572 | 2/1983 |

(Continued)

OTHER PUBLICATIONS

"ADA-ES Tests New Boiler Product," Coal Daily, Apr. 18, 2000, 1 page.

(Continued)

*Primary Examiner* — Timothy Vanoy
(74) *Attorney, Agent, or Firm* — Sheridan Ross P.C.

(57) ABSTRACT

The disclosure provides an improved means of controlling mercury emissions from coal-fired boiler applications. Specifically, the disclosure comprises a static mixing device placed in the flue gas stream. The static mixing device can enhance dispersion of injected sorbents in the flue gas, resulting in improved mercury capture at a lower sorbent injection rate.

40 Claims, 17 Drawing Sheets
(4 of 17 Drawing Sheet(s) Filed in Color)

(51) Int. Cl.
*B01D 53/68* (2006.01)
*B01D 53/64* (2006.01)
*B01D 53/74* (2006.01)
*B01D 46/00* (2006.01)
*B01D 53/52* (2006.01)
*B01D 53/40* (2006.01)
*B01D 53/83* (2006.01)

(52) U.S. Cl.
CPC ..... *B01D2251/404* (2013.01); *B01D 2253/102* (2013.01); *B01D 2253/25* (2013.01); *B01D 2257/204* (2013.01); *B01D 2257/302* (2013.01); *B01D 2257/404* (2013.01); *B01D 2257/602* (2013.01); *B01D 2257/70* (2013.01); *B01D 2258/0283* (2013.01)
USPC ..... 423/210; 423/220; 423/239.1; 423/240 S; 423/244.03; 423/244.07; 423/215.5; 422/168; 422/177

(56) References Cited

U.S. PATENT DOCUMENTS

| | | |
|---|---|---|
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,955,574 A | 4/1934 | Benner et al. |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 2,844,112 A | 7/1958 | Muller |
| 3,004,836 A | 10/1961 | Thompson |
| 3,194,629 A | 7/1965 | Dreibelbis et al. |
| 3,288,576 A | 11/1966 | Pierron et al. |
| 3,332,755 A | 7/1967 | Kukin |
| 3,437,476 A | 4/1969 | Dotson et al. |
| 3,557,020 A | 1/1971 | Shindo et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,803,803 A | 4/1974 | Raduly et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,896,746 A | 7/1975 | Pirsh |
| 3,907,674 A | 9/1975 | Roberts et al. |
| 3,932,494 A | 1/1976 | Yoshida et al. |
| 3,947,354 A | 3/1976 | Swanson et al. |
| 3,956,458 A | 5/1976 | Anderson |
| 3,961,020 A | 6/1976 | Seki |
| 3,970,434 A | 7/1976 | Gasior et al. |
| 3,974,254 A | 8/1976 | de la Cuadra Herrera et al. |
| 4,040,802 A | 8/1977 | Deitz et al. |
| 4,042,664 A | 8/1977 | Cardwell et al. |
| 4,051,316 A | 9/1977 | Wing et al. |
| 4,057,398 A | 11/1977 | Bennett et al. |
| 4,075,282 A | 2/1978 | Storp et al. |
| 4,083,783 A | 4/1978 | Wing et al. |
| 4,089,507 A | 5/1978 | Arai et al. |
| 4,094,777 A | 6/1978 | Sugier et al. |
| 4,101,631 A | 7/1978 | Ambrosini et al. |
| 4,115,518 A | 9/1978 | Delmon et al. |
| 4,133,759 A | 1/1979 | Ikeda et al. |
| 4,148,613 A | 4/1979 | Myers |
| 4,173,454 A | 11/1979 | Heins |
| 4,174,373 A | 11/1979 | Yoshida et al. |
| 4,196,173 A | 4/1980 | DeJong et al. |
| 4,226,601 A | 10/1980 | Smith |
| 4,230,460 A | 10/1980 | Maust, Jr. |
| 4,233,274 A | 11/1980 | Allgulin |
| 4,238,329 A | 12/1980 | Zievers |
| 4,272,250 A | 6/1981 | Burk, Jr. et al. |
| 4,276,431 A | 6/1981 | Schnegg et al. |
| 4,280,817 A | 7/1981 | Chauhan et al. |
| 4,305,726 A | 12/1981 | Brown, Jr. |
| 4,308,242 A * | 12/1981 | Horton .......................... 423/221 |
| 4,308,421 A | 12/1981 | Bogese, II |
| 4,322,218 A | 3/1982 | Nozaki |
| 4,364,818 A | 12/1982 | Schmid et al. |
| 4,372,227 A | 2/1983 | Mahoney et al. |
| 4,377,118 A | 3/1983 | Sadowski |
| 4,377,599 A | 3/1983 | Willard, Sr. |
| 4,385,891 A | 5/1983 | Ligotti |
| 4,387,653 A | 6/1983 | Voss |
| 4,394,354 A | 7/1983 | Joyce |
| 4,420,892 A | 12/1983 | Braun et al. |
| 4,427,630 A | 1/1984 | Aibe et al. |
| 4,438,709 A | 3/1984 | Borio et al. |
| 4,440,100 A | 4/1984 | Michelfelder et al. |
| 4,472,278 A | 9/1984 | Suzuki |
| 4,474,896 A | 10/1984 | Chao |
| 4,498,402 A | 2/1985 | Kober et al. |
| 4,500,327 A | 2/1985 | Nishino et al. |
| 4,514,256 A | 4/1985 | Kober et al. |
| 4,519,807 A | 5/1985 | Nishino et al. |
| 4,519,995 A | 5/1985 | Schrofelbauer et al. |
| 4,527,746 A | 7/1985 | Molls et al. |
| 4,552,076 A | 11/1985 | McCartney |
| 4,555,392 A | 11/1985 | Steinberg |
| 4,564,374 A | 1/1986 | Hofmann |
| 4,572,085 A | 2/1986 | Hepworth |
| 4,577,566 A | 3/1986 | Merrell |
| 4,578,256 A | 3/1986 | Nishino et al. |
| 4,582,936 A | 4/1986 | Ashina et al. |
| 4,586,443 A | 5/1986 | Burge et al. |
| 4,598,652 A | 7/1986 | Hepworth |
| 4,602,918 A | 7/1986 | Steinberg et al. |
| 4,629,721 A | 12/1986 | Ueno |
| 4,668,429 A | 5/1987 | Najjar |
| 4,671,804 A | 6/1987 | Najjar |
| 4,693,731 A | 9/1987 | Tarakad et al. |
| 4,706,579 A | 11/1987 | Merrell |
| 4,708,853 A | 11/1987 | Matviya et al. |
| 4,716,137 A | 12/1987 | Lewis |
| 4,729,882 A | 3/1988 | Ide et al. |
| 4,741,278 A | 5/1988 | Franke et al. |
| 4,753,632 A | 6/1988 | Hofmann et al. |
| 4,758,418 A | 7/1988 | Yoo et al. |
| 4,764,219 A | 8/1988 | Yan |
| 4,765,258 A | 8/1988 | Zauderer |
| 4,784,670 A | 11/1988 | Najjar |
| 4,786,483 A | 11/1988 | Audeh |
| 4,796,548 A | 1/1989 | Merrell et al. |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |

(56) References Cited

U.S. PATENT DOCUMENTS

| | | | |
|---|---|---|---|
| 4,831,942 | A | 5/1989 | Morimoto et al. |
| 4,843,980 | A | 7/1989 | Markham et al. |
| 4,873,930 | A | 10/1989 | Egense et al. |
| 4,886,519 | A | 12/1989 | Hayes et al. |
| 4,886,521 | A | 12/1989 | Khan |
| 4,889,698 | A | 12/1989 | Moller et al. |
| 4,892,567 | A | 1/1990 | Yan |
| 4,915,818 | A | 4/1990 | Yan |
| 4,917,862 | A | 4/1990 | Kraw et al. |
| 4,919,826 | A | 4/1990 | Alzner |
| 4,933,158 | A | 6/1990 | Aritsuka et al. |
| 4,936,047 | A | 6/1990 | Feldmann et al. |
| 4,940,010 | A | 7/1990 | Kubin et al. |
| 4,964,889 | A | 10/1990 | Chao |
| 5,001,994 | A | 3/1991 | Morimoto et al. |
| 5,013,358 | A | 5/1991 | Ball et al. |
| 5,017,135 | A | 5/1991 | Meyer |
| 5,022,329 | A | 6/1991 | Rackley et al. |
| 5,024,171 | A | 6/1991 | Krigmont et al. |
| 5,046,265 | A | 9/1991 | Kalb |
| 5,049,163 | A | 9/1991 | Huang et al. |
| 5,052,312 | A | 10/1991 | Rackley et al. |
| 5,114,578 | A | 5/1992 | Sundström |
| 5,116,793 | A | 5/1992 | Chao et al. |
| 5,124,135 | A | 6/1992 | Girrbach et al. |
| 5,126,300 | A | 6/1992 | Pinnavaia et al. |
| 5,137,854 | A | 8/1992 | Segawa et al. |
| 5,141,724 | A * | 8/1992 | Audeh et al. ................. 423/210 |
| 5,162,598 | A | 11/1992 | Hutchings et al. |
| 5,179,058 | A | 1/1993 | Knoblauch et al. |
| 5,190,566 | A | 3/1993 | Sparks et al. |
| 5,196,648 | A | 3/1993 | Jones |
| 5,202,301 | A | 4/1993 | McNamara |
| 5,207,164 | A | 5/1993 | Breen et al. |
| 5,209,062 | A * | 5/1993 | Vollenweider ................. 60/280 |
| 5,238,488 | A | 8/1993 | Wilhelm |
| 5,282,430 | A | 2/1994 | Nehls, Jr. |
| 5,288,306 | A | 2/1994 | Aibe et al. |
| 5,307,743 | A | 5/1994 | Jones |
| 5,313,915 | A | 5/1994 | McDowell et al. |
| 5,320,051 | A | 6/1994 | Nehls, Jr. |
| 5,320,817 | A | 6/1994 | Hardwick et al. |
| 5,324,336 | A | 6/1994 | Child |
| 5,328,673 | A | 7/1994 | Kaczur et al. |
| 5,333,558 | A | 8/1994 | Less, Jr. |
| 5,336,835 | A | 8/1994 | McNamara |
| 5,342,592 | A | 8/1994 | Peter-Hoblyn et al. |
| 5,346,674 | A | 9/1994 | Weinwurm et al. |
| 5,350,728 | A | 9/1994 | Cameron et al. |
| 5,352,647 | A | 10/1994 | Suchenwirth |
| 5,354,363 | A | 10/1994 | Brown, Jr. et al. |
| 5,357,002 | A | 10/1994 | Lezzi et al. |
| 5,364,421 | A | 11/1994 | Westby et al. |
| 5,368,617 | A | 11/1994 | Kindig |
| 5,372,619 | A | 12/1994 | Greinke et al. |
| 5,379,902 | A | 1/1995 | Wen et al. |
| 5,403,548 | A | 4/1995 | Aibe et al. |
| 5,409,522 | A * | 4/1995 | Durham et al. ................. 75/670 |
| 5,435,980 | A | 7/1995 | Felsvang et al. |
| 5,447,703 | A | 9/1995 | Baer et al. |
| 5,460,643 | A | 10/1995 | Hasenpusch et al. |
| 5,505,746 | A | 4/1996 | Chriswell et al. |
| 5,505,766 | A | 4/1996 | Chang |
| 5,569,436 | A | 10/1996 | Lerner |
| 5,571,490 | A | 11/1996 | Bronicki et al. |
| 5,575,982 | A | 11/1996 | Reiss et al. |
| 5,577,910 | A | 11/1996 | Holland |
| 5,587,003 | A | 12/1996 | Bulow et al. |
| 5,607,496 | A | 3/1997 | Brooks |
| 5,613,851 | A | 3/1997 | Trawöger et al. |
| 5,618,508 | A | 4/1997 | Suchenwirth et al. |
| 5,635,150 | A | 6/1997 | Coughlin |
| 5,658,487 | A | 8/1997 | Carey et al. |
| 5,659,100 | A | 8/1997 | Lin |
| 5,670,122 | A | 9/1997 | Zamansky et al. |
| 5,672,323 | A | 9/1997 | Bhat et al. |
| 5,678,959 | A | 10/1997 | Griffard et al. |
| 5,679,259 | A | 10/1997 | Bolser |
| 5,695,726 | A | 12/1997 | Lerner |
| 5,733,360 | A | 3/1998 | Feldman et al. |
| 5,733,516 | A | 3/1998 | DeBerry |
| 5,738,834 | A | 4/1998 | DeBerry |
| 5,741,397 | A | 4/1998 | Kraver |
| 5,785,932 | A | 7/1998 | Helfritch |
| 5,787,823 | A | 8/1998 | Knowles |
| 5,795,159 | A | 8/1998 | Ralls et al. |
| 5,797,742 | A | 8/1998 | Fraker |
| 5,809,911 | A | 9/1998 | Feizollahi |
| 5,810,910 | A | 9/1998 | Ludwig et al. |
| 5,819,672 | A | 10/1998 | Radway et al. |
| 5,827,352 | A | 10/1998 | Altman et al. |
| 5,855,649 | A | 1/1999 | Durham et al. |
| 5,871,703 | A | 2/1999 | Alix et al. |
| 5,885,076 | A | 3/1999 | Ralls et al. |
| 5,888,256 | A | 3/1999 | Morrison |
| 5,893,943 | A | 4/1999 | Durham et al. |
| 5,894,806 | A | 4/1999 | Smyrniotis et al. |
| 5,897,688 | A | 4/1999 | Voogt et al. |
| 5,899,678 | A | 5/1999 | Thomson et al. |
| 5,900,042 | A | 5/1999 | Mendelsohn et al. |
| 5,910,292 | A | 6/1999 | Alvarez, Jr. et al. |
| 5,972,066 | A | 10/1999 | Lehtinen |
| 5,989,506 | A | 11/1999 | Markovs |
| 6,022,216 | A | 2/2000 | Cattani |
| 6,024,931 | A | 2/2000 | Hanulik |
| 6,027,551 | A | 2/2000 | Hwang et al. |
| 6,027,552 | A | 2/2000 | Ruck et al. |
| 6,083,289 | A | 7/2000 | Ono et al. |
| 6,083,306 | A | 7/2000 | Cattani |
| 6,117,403 | A | 9/2000 | Alix et al. |
| 6,132,692 | A | 10/2000 | Alix et al. |
| 6,136,281 | A | 10/2000 | Meischen et al. |
| 6,136,749 | A | 10/2000 | Gadkaree |
| 6,139,751 | A | 10/2000 | Bogaert et al. |
| 6,165,366 | A | 12/2000 | Sarangapani |
| 6,200,543 | B1 | 3/2001 | Allebach et al. |
| 6,206,685 | B1 | 3/2001 | Zamansky et al. |
| 6,221,001 | B1 | 4/2001 | Comer et al. |
| 6,240,859 | B1 | 6/2001 | Jones, Jr. |
| 6,248,217 | B1 | 6/2001 | Biswas et al. |
| 6,250,235 | B1 | 6/2001 | Oehr et al. |
| 6,258,334 | B1 | 7/2001 | Gadkaree et al. |
| 6,258,456 | B1 | 7/2001 | Meyer |
| 6,267,802 | B1 | 7/2001 | Baldrey et al. |
| 6,284,199 | B1 | 9/2001 | Downs et al. |
| 6,284,208 | B1 | 9/2001 | Thomassen |
| 6,328,939 | B1 | 12/2001 | Amrhein |
| 6,368,511 | B1 | 4/2002 | Weissenberg et al. |
| 6,372,187 | B1 | 4/2002 | Madden et al. |
| 6,375,909 | B1 | 4/2002 | Dangtran et al. |
| 6,401,449 | B1 * | 6/2002 | Hofmann et al. ................. 60/274 |
| 6,447,740 | B1 | 9/2002 | Caldwell et al. |
| 6,471,506 | B1 | 10/2002 | Zamansky et al. |
| 6,475,451 | B1 | 11/2002 | Leppin et al. |
| 6,475,461 | B1 | 11/2002 | Ohsaki et al. |
| 6,484,651 | B1 | 11/2002 | Shepard, Jr. et al. |
| 6,514,907 | B2 | 2/2003 | Tsutsumi et al. |
| 6,521,021 | B1 | 2/2003 | Pennline et al. |
| 6,524,371 | B2 | 2/2003 | El-Shoubary et al. |
| 6,528,030 | B2 | 3/2003 | Madden et al. |
| 6,533,842 | B1 | 3/2003 | Maes et al. |
| 6,547,874 | B2 | 4/2003 | Eck et al. |
| 6,558,454 | B1 | 5/2003 | Chang et al. |
| 6,582,497 | B1 | 6/2003 | Maes et al. |
| 6,589,318 | B2 | 7/2003 | El-Shoubary et al. |
| 6,595,848 | B1 | 7/2003 | Robinson |
| 6,610,263 | B2 | 8/2003 | Pahlman et al. |
| 6,613,110 | B2 | 9/2003 | Sanyal |
| 6,638,347 | B2 | 10/2003 | El-Shoubary et al. |
| 6,638,485 | B1 | 10/2003 | Iida et al. |
| 6,649,082 | B2 | 11/2003 | Hayasaka et al. |
| 6,719,828 | B1 | 4/2004 | Lovell et al. |
| 6,726,888 | B2 | 4/2004 | Lanier et al. |
| 6,729,248 | B2 | 5/2004 | Johnson et al. |

(56) References Cited

U.S. PATENT DOCUMENTS

| | | | |
|---|---|---|---|
| 6,732,055 B2 | 5/2004 | Bagepalli et al. |
| 6,737,031 B2 | 5/2004 | Beal et al. |
| 6,773,471 B2 | 8/2004 | Johnson et al. |
| 6,787,742 B2 | 9/2004 | Kansa et al. |
| 6,790,420 B2 | 9/2004 | Breen et al. |
| 6,790,429 B2 | 9/2004 | Ciampi |
| 6,808,692 B2 | 10/2004 | Oehr |
| 6,827,837 B2 | 12/2004 | Minter |
| 6,841,513 B2 | 1/2005 | El-Shoubary et al. |
| 6,848,374 B2 | 2/2005 | Srinivasachar et al. |
| 6,864,008 B2 | 3/2005 | Otawa et al. |
| 6,878,358 B2 | 4/2005 | Vosteen et al. |
| 6,916,762 B2 | 7/2005 | Shibuya et al. |
| 6,939,523 B2 | 9/2005 | D'Alesandro |
| 6,942,840 B1 | 9/2005 | Broderick |
| 6,945,925 B2 | 9/2005 | Pooler et al. |
| 6,953,494 B2 | 10/2005 | Nelson, Jr. |
| 6,960,329 B2 | 11/2005 | Sellakumar |
| 6,962,617 B2 | 11/2005 | Simpson |
| 6,969,494 B2 | 11/2005 | Herbst |
| 6,972,120 B2 | 12/2005 | Holste et al. |
| 6,974,562 B2 | 12/2005 | Ciampi et al. |
| 6,974,564 B2 | 12/2005 | Biermann et al. |
| 6,975,975 B2 | 12/2005 | Fasca |
| 7,118,720 B1 | 10/2006 | Mendelsohn et al. |
| 7,141,091 B2 | 11/2006 | Chang |
| 7,151,199 B2 | 12/2006 | Martens et al. |
| 7,153,481 B2 | 12/2006 | Bengtsson et al. |
| 7,156,959 B2 | 1/2007 | Herbst |
| 7,250,387 B2 | 7/2007 | Durante et al. |
| 7,312,300 B2 | 12/2007 | Mitchell |
| 7,331,533 B2 | 2/2008 | Bayer et al. |
| 7,332,002 B2 | 2/2008 | Johnson et al. |
| 7,361,209 B1 | 4/2008 | Durham et al. |
| 7,381,380 B2 | 6/2008 | Herbst |
| 7,381,387 B2 | 6/2008 | Lissianski et al. |
| 7,384,615 B2 | 6/2008 | Boardman et al. |
| 7,387,719 B2 | 6/2008 | Carson et al. |
| 7,413,719 B2 | 8/2008 | Digdon |
| 7,416,137 B2 | 8/2008 | Hagen et al. |
| 7,435,286 B2 | 10/2008 | Olson et al. |
| 7,452,392 B2 | 11/2008 | Nick et al. |
| 7,473,303 B1 | 1/2009 | Higgins et al. |
| 7,476,324 B2 | 1/2009 | Ciampi et al. |
| 7,479,215 B2 | 1/2009 | Carson et al. |
| 7,479,263 B2 | 1/2009 | Chang et al. |
| 7,494,632 B1 | 2/2009 | Klunder |
| 7,507,083 B2 | 3/2009 | Comrie |
| 7,514,052 B2 | 4/2009 | Lissianski et al. |
| 7,517,445 B2 | 4/2009 | Carson et al. |
| 7,517,511 B2 | 4/2009 | Schofield |
| 7,524,473 B2 | 4/2009 | Lindau et al. |
| 7,531,708 B2 | 5/2009 | Carson et al. |
| 7,544,339 B2 | 6/2009 | Lissianski et al. |
| 7,862,646 B2 | 1/2011 | Carruthers et al. |
| 8,124,036 B1 | 2/2012 | Baldrey et al. |
| 8,221,532 B2 | 7/2012 | Carruthers et al. |
| 8,372,362 B2 | 2/2013 | Durham et al. |
| 8,383,071 B2 | 2/2013 | Dillon et al. |
| 8,439,989 B2 | 5/2013 | Baldrey et al. |
| 2002/0068030 A1 | 6/2002 | Nolan et al. |
| 2002/0114749 A1 | 8/2002 | Cole |
| 2002/0121482 A1 | 9/2002 | Ciampi et al. |
| 2003/0065236 A1 | 4/2003 | Vosteen et al. |
| 2003/0079411 A1 | 5/2003 | Kansa et al. |
| 2003/0164309 A1 | 9/2003 | Nakamura et al. |
| 2003/0166988 A1 | 9/2003 | Hazen et al. |
| 2003/0206843 A1 | 11/2003 | Nelson, Jr. |
| 2004/0013589 A1 | 1/2004 | Vosteen et al. |
| 2004/0016377 A1 | 1/2004 | Johnson et al. |
| 2004/0129607 A1 | 7/2004 | Slater et al. |
| 2004/0208809 A1 | 10/2004 | D'Alesandro |
| 2004/0256247 A1 | 12/2004 | Carson et al. |
| 2005/0020828 A1 | 1/2005 | Therkelsen |
| 2005/0026008 A1 | 2/2005 | Heaton et al. |
| 2005/0039598 A1 | 2/2005 | Srinivasachar et al. |
| 2005/0056548 A1 | 3/2005 | Minter |
| 2005/0090379 A1 | 4/2005 | Shibuya et al. |
| 2005/0132880 A1 | 6/2005 | Chang |
| 2006/0027488 A1 | 2/2006 | Gauthier |
| 2006/0029531 A1 | 2/2006 | Breen et al. |
| 2006/0051270 A1 | 3/2006 | Brunette |
| 2006/0124444 A1 | 6/2006 | Nakamura et al. |
| 2006/0185226 A1 | 8/2006 | McDonald et al. |
| 2006/0204418 A1 | 9/2006 | Chao et al. |
| 2006/0205592 A1 | 9/2006 | Chao et al. |
| 2007/0051239 A1 | 3/2007 | Holmes et al. |
| 2007/0156288 A1 | 7/2007 | Wroblewski et al. |
| 2007/0167309 A1 | 7/2007 | Olson |
| 2007/0179056 A1 | 8/2007 | Baek et al. |
| 2007/0180990 A1 | 8/2007 | Downs et al. |
| 2007/0184394 A1 | 8/2007 | Comrie |
| 2008/0060519 A1 | 3/2008 | Maly et al. |
| 2008/0069749 A1 | 3/2008 | Liu et al. |
| 2008/0107579 A1 | 5/2008 | Downs et al. |
| 2008/0115704 A1 | 5/2008 | Berry et al. |
| 2008/0121142 A1 | 5/2008 | Comrie |
| 2008/0233238 A1 | 9/2008 | Roney et al. |
| 2009/0007785 A1 | 1/2009 | Kimura et al. |
| 2009/0031929 A1 | 2/2009 | Boardman et al. |
| 2009/0047199 A1 | 2/2009 | Arrol et al. |
| 2009/0081092 A1 | 3/2009 | Yang et al. |
| 2009/0104097 A1 | 4/2009 | Dunson, Jr. |
| 2009/0117019 A1 | 5/2009 | Comrie |
| 2009/0136401 A1 | 5/2009 | Yang et al. |
| 2010/0068111 A1 | 3/2010 | Walsh, Jr. |
| 2010/0221166 A1* | 9/2010 | Muggli .................... 423/245.1 |
| 2011/0206586 A1 | 8/2011 | Mooney |
| 2013/0034481 A1 | 2/2013 | Dillon et al. |
| 2013/0139683 A1 | 6/2013 | Hanson et al. |

FOREIGN PATENT DOCUMENTS

| | | |
|---|---|---|
| CA | 2150529 | 12/1995 |
| CA | 2418578 | 8/2003 |
| CA | 2435474 | 1/2004 |
| CN | 1052838 | 7/1991 |
| DE | 2548845 | 5/1976 |
| DE | 2713197 | 10/1978 |
| DE | 2917273 | 11/1980 |
| DE | 3615759 | 11/1987 |
| DE | 3628963 | 3/1988 |
| DE | 3711503 | 10/1988 |
| DE | 3918292 | 4/1990 |
| DE | 4218672 | 8/1993 |
| DE | 4308388 | 10/1993 |
| DE | 4422661 | 1/1996 |
| DE | 19520127 | 12/1996 |
| DE | 19850054 | 5/2000 |
| DE | 10233173 | 7/2002 |
| DE | 60019603 | 4/2006 |
| EP | 0009699 | 4/1980 |
| EP | 0115634 | 8/1984 |
| EP | 0208036 | 1/1987 |
| EP | 0220075 | 4/1987 |
| EP | 0254697 | 1/1988 |
| EP | 0433674 | 11/1990 |
| EP | 0433677 | 6/1991 |
| EP | 0435848 | 7/1991 |
| EP | 0628341 | 12/1994 |
| EP | 0666098 | 8/1995 |
| EP | 0709128 | 5/1996 |
| EP | 0794240 | 9/1997 |
| EP | 0908217 | 4/1999 |
| EP | 1213046 | 10/2001 |
| EP | 1199354 | 4/2002 |
| EP | 1271053 | 1/2003 |
| EP | 1386655 | 2/2004 |
| EP | 1570894 | 9/2005 |
| FR | 1394547 | 4/1965 |
| FR | 1394847 | 4/1965 |
| GB | 1121845 | 7/1968 |
| JP | 11-94234 | 6/1905 |
| JP | 49-53590 | 5/1974 |

(56) References Cited

FOREIGN PATENT DOCUMENTS

| | | |
|---|---|---|
| JP | 49-53591 | 5/1974 |
| JP | 49-53592 | 5/1974 |
| JP | 49-53593 | 5/1974 |
| JP | 49-53594 | 5/1974 |
| JP | 49-66592 | 6/1974 |
| JP | 51-5586 | 1/1976 |
| JP | 59-10343 | 1/1984 |
| JP | 59-76537 | 5/1984 |
| JP | 59-160534 | 9/1984 |
| JP | 63-100918 | 5/1988 |
| JP | 09-239265 | 9/1997 |
| JP | 10-109016 | 4/1998 |
| JP | 2000-197811 | 7/2000 |
| JP | 2000-205525 | 7/2000 |
| JP | 2001-347131 | 12/2001 |
| JP | 2002-355031 | 12/2002 |
| JP | 2003-065522 | 3/2003 |
| JP | 2004-066229 | 3/2004 |
| JP | 2005-230810 | 9/2005 |
| KR | 2004-0010276 | 1/2004 |
| WO | WO 86/04602 | 8/1986 |
| WO | WO 91/09977 | 7/1991 |
| WO | WO 96/30318 | 10/1996 |
| WO | WO 97/17480 | 5/1997 |
| WO | WO 98/15357 | 4/1998 |
| WO | WO 99/58228 | 11/1999 |
| WO | WO 01/28787 | 4/2001 |
| WO | WO 01/38787 | 5/2001 |
| WO | WO 03/093518 | 11/2003 |
| WO | WO 2005/092477 | 10/2005 |
| ZA | 2003-05568 | 7/2004 |

OTHER PUBLICATIONS

"Bromine" webpage, http://www2.gtz.de/uvp/publika/English/vol318.htm, printed Sep. 14, 2006, 4 pages.
"Burning PRP Coals ADA Environmental Offers Flyash Solutions," Western Coal Advisory, Summer/Autumn 1999, 1 page.
"Chlorine" webpage, http://www2.gtz.de/uvp/publika/English/vol324.htm, printed Sep. 14, 2006, 4 pages.
"Cyclone Furnaces," Chapter 10 of Steam/Its Generation and Use, Babcock & Wilcox, 1972, 38th Edition, pp. 10-1 to 10-8.
"Description of Operation of an Activated Carbon Injection System Utilizing Dense Phase Material Transport," ADA-ES internal documentation, Nov. 10, 2011, 2 pages.
"DOE Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.
"DrägerSenor C12—68 08 865 Data Sheet," Dräger Product Information, Apr. 1997, pp. 1-6 (with English translation).
"Enhanced Mercury Control: KNX™Coal Additive Technology," Alstom Power Inc., printed Aug. 3, 2006, 1 page.
"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.
"Fuel Ash Effects on Boiler Design and Operation," Chapter 21 of Steam/Its Generation and Use, Babcock & Wilcox Company, 2005, 41st Edition, pp. 21-1 to 21-27.
"Fuel-ash Effects on Boiler Design and Operation," Chapter 15 of Steam/Its Generation and Use, Babcock and Wilcox Company, 1972, 38th Edition, pp. 15-1 to 15-26.
"Gas Phase Filtration," Vaihtoilma White Air Oy, date unknown, 3 pages.
"Impregnated Activated Carbon," Products and Technologies Website, as early as 1999, available at http://www.calgoncarbon.com/product/impregnated.html, printed on Dec. 18, 1999, p. 1.
"Incineration: Taking the heat out of complex waste," Bayer Industry Services website, as early as 2005, available at http://web.archive.org/web/20060318115553/www.entsorgung.bayer.com/index.cfm?PAGE_ID=2 99, pp. 1-2, printed on Jun. 4, 2009.
"Iron- and Steelmaking," date unknown, pp. 646-660.
"Protecting Human Health. Mercury Poisoning," US EPA Website, as early as Oct. 8, 1999, available at http://www.epa.gov/region02/health/mercury/, printed on Feb. 5, 2002, pp. 1-4.
"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.
Aldrich Chemical Catalog, Aldrich Chemical Co., Inc., 1996, pp. 863-866.
Anders et al., "Selenium in Coal-Fired Steam Plant Emissions," Environmental Science & Technology, 1975, vol. 9, No. 9, pp. 856-858.
Bansal et al., Active Carbon, Marcel Dekker, Inc., New York, 1989, pp. 1-3, 24-29, 391-394, 457.
Benson et al., "Air Toxics Research Needs: Workshop Findings," Proceedings of the 1993 So2 Control Symposium, U.S. EPA, vol. 2, Session 6A, Aug. 24-27, 1993, pp. 1-17, Boston, MA.
Biswas et al., "Control of Toxic Metal Emissions from Combustors Using Sorbents: A Review," J. Air & Waste Manage. Assoc., Feb. 1998, vol. 48, pp. 113-127.
Biswas et al., "Introduction to the Air & Waste Management Association's 29th Annual Critical Review," Journal of the Air & Waste Management Association, Jun. 1999, pp. 1-2.
Bloom, "Mercury Speciation in Flue Gases: Overcoming the Analytical Difficulties," presented at EPRI Conference, Managing Hazardous Air Pollutants, State of the Arts, Washington D.C., Nov. 1991, pp. 148-160.
Brown et al., "Mercury Measurement and Its Control: What We Know, Have Learned, and Need to Further investigate," J. Air & Waste Manage. Assoc, pp. 1-97 (Jun. 1999).
Buschmann et al., "The KNX™ Coal Additive Technology a Simple Solution for Mercury Emissions Control," Alstom Power Environment, Dec. 2005, pp. 1-7.
Bustard et al., "Full-Scale Evaluation of Sorbent Injection for Mercury Control on Coal-Fired Power Plants" Air Quality III, ADA Environmental Solutions, LLC (Arlington, VA) (Sep. 12, 2002).
Calgon Carbon product and bulletin webpages, 11 pages (undated).
Carey et al., "Factors Affecting Mercury Control in Utility Flue Gas Using Activated Carbon," J. Air & Waste Manage. Assoc., Dec. 1998, vol. 48, pp. 1166-1174.
De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.
Declaration of Richard Schlager; Sep. 18, 2002.
Donnet et al., eds., Carbon Black: Science and Technology, 2nd Edition, Marcel Dekker, New York, 1993, pp. 182-187, 218-219.
Dunham et al., "Investigation of Sorbent Injection for Mercury Control in Coal-Fired Boilers," Energy & Environmental Research Center, University of North Dakota (Sep. 10, 1998).
Durham et al., "Full-Scale Evaluation of Mercury Control by Injecting Activated Carbon Upstream of ESPS," Air Quality IV Conference, ADA Environmental Solutions (Littleton, Colorado) (Feb. 10, 2003).
Edwards et al., "A Study of Gas-Phase Mercury Speciation Using Detailed Chemical Kinetics," in Journal of the Air and Waste Management Association, vol. 51, Jun. 2001, pp. 869-877.
Fabian et al., "How Bayer incinerates wastes," Hydrocarbon Processing, Apr. 1979, pp. 183-192.
Felsvang et al., "Activated Carbon Injection in Spray Dryer/ESP/FF for Mercury and Toxics Control" (Feb. 10, 1993).
Felsvang, K. et al., "Air Toxics Control by Spray Dryer," Presented at the 1993 SO2 Control Symposium, Boston, MA, Aug. 24-27, 1993, 16 pages.
Felsvang, K. et al., "Control of Air Toxics by Dry FGDSystems," Power-Gen '92 Conference, 5th International Conference & Exhibition for the Power Generating Industries, Orlando, FL, Nov. 17-19, 1992, pp. 189-208.

(56) References Cited

OTHER PUBLICATIONS

Galbreath et al., "Mercury Transformations in Coal Combustion Flue Gas," Fuel Processing Technology, 1999, vol. 65-66, pp. 291-292.

Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.

Gale, "Mercury Adsorption and Oxidation Kinetics in Coal-Fired Flue Gas," Proceedings of the 30th International Technical Conference on Coal Utilazation & Fuel Systems, 2005, pp. 979-990.

Gale, "Mercury Control with Calcium-Based Sorbents and Oxidizing Agents," Final Report of Southern Research Institute, Jul. 2005, 137 pages.

Gale, "Mercury Control with Calcium-Based Sorbents and Oxidizing Agents," Southern Research Institute, Mercury Control Technology R&D Program Review Meeting, Aug. 12-13, 2003, 25 pages.

Geiger et al, "Einflußdes Schwefels auf Die Doxin—und Furanbuilding bei der Klärschlammverbrennung," VGB Kraftwerkstechnik, 1992, vol. 72, pp. 159-165.

Ghorishi et al., "Effects of Fly Ash Transition Metal Content and Flue Gas HCl/SO2 Ratio on Mercury Speciation in Waste Combustion," in Environmental Engineering Science, Nov. 2005, vol. 22, No. 2, pp. 221-231.

Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.

Granite et al., "Novel Sorbents for Mercury Removal from Flue Gas," National Energy Technology Laboratory (Apr. 10, 2000).

Griffin, "A New Theory of Dioxin Formation in Municipal Solid Waste Combustion," Chemosphere, 1986, vol. 15, Nos. 9-12, pp. 1987-1990.

Gullet, B.K. et al, "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27, 1993, 26 pages.

Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.

Gullett, B. et al., "Removal of Illinois Coal-Based Volatile Tracy Mercury," Final Technical Report, Sep. 1, 1996 through Aug. 31, 1997.

Guminski, "The Br-Hg (Bromine-Mercury) System," Journal of Phase Equilibria, Dec. 2000, vol. 21, No. 6, pp. 539-543.

Hall et al., "Chemical Reactions of Mercury in Combustion Flue Gases," Water, Air, and Soil Pollution 56:3-14,1991.

Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).

Henning et al., "Impregnated activated carbon for environmental protection," Gas Separation & Purification, Butterworth-Heinemann Ltd., vol. 7, No. 4 (Feb. 9, 1993).

Ismo et al., "Formation of Aromatic Chlorinated Compounds Catalyzed by Copper and Iron," Chemosphere vol. 34, No. 12, pp. 2649-2662 (1997).

Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.

Kellie et al., "The Role of Coal Properties on Chemical and Physical Transformation on Mercury in Post Combustion," presented at Air Quality IV Conference, Arlington, VA, Sep. 2003, pp. 1-14.

Kilgroe et al., "Fundamental Science and Engineering of Mercury Control in Coal-Fired Power Plants," presented at Air Quality IV Conference, Arlington, VA, Sep. 2003.

Kobayashi, "Japan EnviroChemicals, Ltd. Overview," Feb. 3, 2002, 3 pages.

Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kramlich.pdf, pp. 1-2.

Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.

Krishnan et al., "Mercury Control in Municipal Waste Combustors and Coal Fired Utilities," Environmental Progress, ProQuest Science Journals, Spring 1997, vol. 16, No. 1, pp. 47-53.

Krishnan et al., "Sorption of Elemental Mercury by Activated Carbons," Environmental Science and Technology, 1994, vol. 28, No. 8, pp. 1506-1512.

Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.

Lemieux et al., "Interactions Between Bromine and Chlorine in a Pilot-Scale Hazardous Waste Incinerator," paper presented at 1996 International Incineration Conference, Savannah, GA, May 6-10, 1996.

Linak et al., "Toxic Metal Emissions from Incineration: Mechanisms and Control" Progress in Energy & Combustion Science, 1993, vol. 19, pp. 145-185.

Lissianski et al., "Effect of Coal Blending on Mercury Removal," presented at the Low Rank Fuels Conference, Billings, MT, Jun. 24-26, 2003, pp. 1-9.

Livengood et al,, "Enhanced Control of Mercury Emissions Through Modified Speciation," for Presentation at the Air & Waste Management Association's 90th Meeting & Exhibition, Jun. 8-13, 1997, 14 pages.

Livengood et al., "Development of Mercury Control Techniques for Utility Boilers," for Presentation at the 88th Air & Waste Management Association Annual Meeting & Exhibit, Jun. 18-23, 1995, pp. 1-14.

Livengood et al., "Investigation of Modified Speciation for Enhanced Control of Mercury," Argonne National Laboratory, 1998, available at http://www.netl.doe.gov/publications/proceedings/97/97ps/ps_pdf/PS2B-9.pdf, pp. 1-15.

Luijk et al., "The Role of Bromine in the De Novo Synthesis in a Model Fly Ash System," Chemosphere, 1994, vol. 28, No. 7, pp. 1299-1309.

Martel, K., "Brennstoff-und lastspezifische Untersuchungen zum Verhalten von Schwermetallen in Kohlenstaubfeuerungen [Fuel and load specific studies on the behavior of heavy metals in coal firing systems ]," Fortschritt-Berichte VDI, Apr. 2000, pp. 1-240.

McCoy et al., "Full-Scale Mercury Sorbent Injection Testing at DTE Energy's St. Clair Station," Paper #97, DTE Energy, as early as 2004, pp. 1-9.

Mills Jr., "Techline: Meeting Mercury Standards," as early as Jun. 18, 2001, available at http://www.netl.doe/publications/press/2001/tl_mercuryel2.html, printed on Feb. 5, 2002, pp. 1-3.

Niessen, Combustion and Incineration Processes, 2002, Marcel Dekker, 3rd Edition, p. 25.

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Nucon International, Inc., "Nusorb Mersorb Family of Adsorbents for Mercury Control," As early as Jan. 2002, 3 pages.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper # 142, pp. 1-8.

(56) References Cited

OTHER PUBLICATIONS

Olson et al., "Oxidation Kinetics and the Model for Mercury Capture on Carbon in Flue Gas," presented at Air Quality V Conference, Sep. 21, 2005, pp. 1-7.
Oppenheimer et al., "Thermische Entsorgung von Produktionsabfällen," Entsorgungs-Praxis, 2000, vol. 6, pp. 29-33.
Pavlish et al., "Status Review of Mercury Control Options for Coal-Fired Power Plants," Fuel Processing Technology, Aug. 2003, vol. 82, pp. 89-165.
"RBHG 4 Combats Mercury Pollution," Know-How, Norit, vol. 6(2), 2003, 3 pages.
Revised Declaration of Richard Schlager, Aug. 19, 2003.
Richardson et al., "Chemical Addition for Mercury Control in Flue Gas Derived from Western Coals," presented at the 2003 Combined Power Plant Air Pollutant Control Mega Symposium, Washington D.C., May 2003, Paper # 63, pp. 1-16.
Sage et al., "Relationship of Coal-Ash Viscosity to Chemical Composition," Journal of Engineering for Power, Apr. 1960, pp. 145-155.
Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.
Senior et al., "Gas-Phase Transformations of Mercury in Coal-Fired Power Plants," Fuel Processing Technology, vol. 63, 2000, pp. 197-213.
Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT (Oct. 28-Nov. 2, 2001).
Singer, J., ed., "Development of Marine Boilers," Combustion Fossil Power, Combustion Engineering, Inc., Windsor, CT, 1991, Ch. 3, pp. 10-4-10-14.
Sjostrom et al., "Full-Scale Evaluation of Mercury Control at Great River Energy's Stanton Generating Station Using Injected Sorbents and a Spray Dryer/Baghouse," Air Quality III Conference, Session A3b (Feb. 10, 2002).
Sjostrom et al., "Full-Scale Evaluation of Mercury Control by Injecting Activated Carbon Upstream of a Spray Dryer and Fabric Filter," Presented at the 2004 combined power plant air pollutant control mega symposium, Washington, D.C., Aug. 2004, 18 pages.
Sjostrom, "Evaluation of Sorbent Injection for Mercury Control," ADA-ES, Inc. Topical Report for Basin Electric Power Cooperative's Laramie River Station, Jan. 16, 2006, 49 pages.
Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 2005, 85 pages.
SKC, "The Essential Reference for air sampling," 1997 Comprehensive Catalog & Air Sampling Guide (4 pages).
Sliger et al., "Towards the Development of a Chemical Kinetic Model for the Homogeneous Oxidation of Mercury by Chlorine Species," Fuel Processing Technology, vol. 65-66, 2000, pp. 423-438.
Speight, ed., The Chemistry and Technology of Coal, CRC Press, 1994, pp. 152-155.
Starns et al., "Full-Scale Evaluation of TOXECON II™ on a Lignite-Fired Boiler" presented at US EPA/DOE/EPRI Combiner Power Plant Air Pollutant Control Symposium: The Mega Symposium, Washington, DC (Aug. 30-Sep. 2, 2004).
Steele "Dense-Phase Pneumatic Conveying Systems," Powder/Bulk solids, Jan. 2007, 5 pages.
Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.
Teller et al., "Mercury Removal from Incineration Flue Gas," Air and Water Technologies Co., for presentation at the 84th Annual Meeting & Exhibition Vancouver, British Columbia, Jun. 16-21, 1991.
United States Environmental Protection Agency, "Study of Hazardous Air Pollutant Emissions from Electric Tility Steam Generating Units," Report to Congress, vol. 1-2, EPA-453/R-98-004a&b, Feb. 1998, pp. 1-165.
United States Environmental Protection Agency, EPA-452/R-97-010, "Mercury Study Report to Congress' vol. VIII—An Evaluation of Mercury Control Technologies and Costs," Dec. 1997.
Urabe et al., "Experimental Studies on Hg Vapour Removal Using Corona Discharge for Refuse Incinerator," Chemical Abstracts, Oct. 1997, vol. 109, 37 pages (includes translation).
Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).
Verhulst et al., "Thermodynamic behaviour of metal chlorides and sulfates under the conditions of incineration furnaces," Environmental Science & Technology, 1996, vol. 30, No. 1, pp. 50-56.
Vidic et al., "Uptake of Elemental Mercury Vapors by Activated Carbons;," Journal of the Air & Waste Management Association, 1996, vol. 46, pp. 241-250.
Vidic et al., "Vapor-phase elemental mercury adsorption by activated carbon impregnated with chloride and cheltinq agents," Carbon, 2001, vol. 39, pp. 3-14.
Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.
Vosteen, et al, "Mercury—Related Chemistry in Waste Incineration and Power Generation Flue Gases," Sep. 2003, Air Quality IV, pp. 1-8.
Wanke et al., "The influence of flame retarded plastic foams upon the formation of Br containing dibenzo-p-dioxins and dibenzofurans in a MSWI," Organohalogen Compounds, 1996, vol. 28, pp. 530-535.
"Speciality Impregnated Carbons," Waterlink/Barnebey Sutcliff, copyright 2000, 5 pages.
Weber et al., "The Role of Copper(II) Chloride in the Formation of Organic Chlorine in Fly Ash," Chemosphere, 2001, vol. 42, pp. 479-582.
White et al., "Field Test of Carbon Injection for Mercury Control at Camden County Municipal Waste Combustor," EPA-600/R-93-181 (NTIS PB94-101540), Sep. 1993, pp. 1-11.
Working project report for period Oct. 1, 1999 to Sep. 30, 2001 from Institut fur Verhrenstechnik and Dampfkesselwessen (IVD), Universitat Stuttgart, dated Mar. 28, 2002, pp. 14-38.
Zygarlicke et al., "Flue gas interactions of mercury, chlorine, and ash during coal combustion," Proceedings of the 23rd International Technical Conference on Coal Utilization and Fuel Systems, Clearwater, Florida, Mar. 9-13, 1998, pp. 517-526 (ISBN 0-03206602302).
Background of the invention for the above captioned application (previously provided), 2013.
"File: Static Mixer Flow Division.png," Wikipedia, Mar. 24, 2009, Attribution: Ambanmba at en.wikipedia, available at www.en.wikipedia.org/wiki/File:Static_Mixer_Flow_Division.png, 3 pages.
"Static Mixer," Wikipedia, 2013, available at www.en.wikipedia.org/wiki/Static_mixer, 3 pages.
"Static Mixer (Engineering Design Guideline)," KLM Technology Group, 2012, available at www.klmtechgroup.com, 24 pages.
Hirschberg, "Static mixers for flue gas treatment applications," Sulzer Chemtech, 2011, 11 pages.
"Handling Hydrated Lime from a Lime Supplier's Perspective," Workshop 25, 2010 APC Round Table & Expo Presentation, Reinhold Enviromental Ltd., Jul. 18-20, 2010, 33 pages.

\* cited by examiner

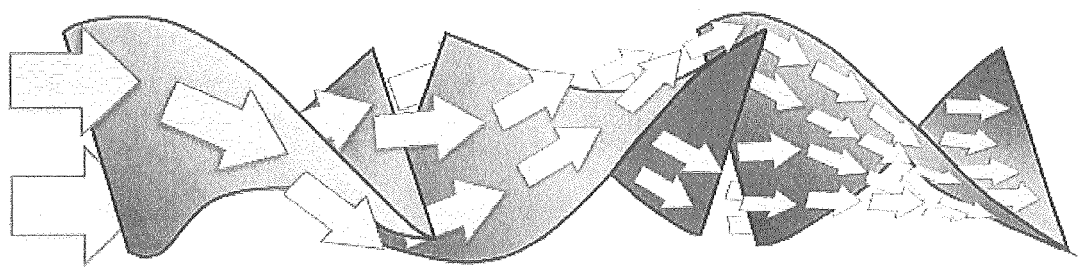
Flow Division
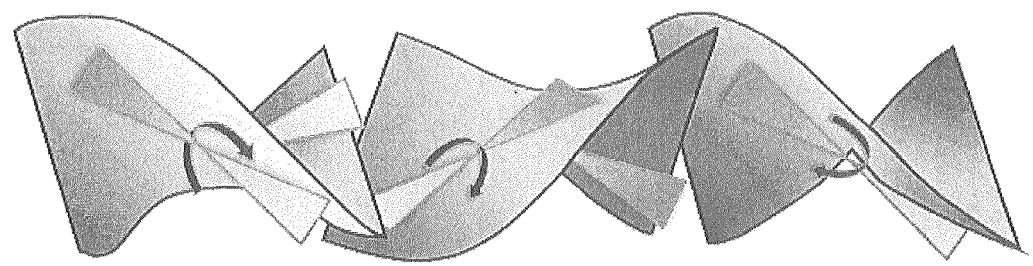
Radial Mixing
*PRIOR ART*
*FIGS. 13A-B*

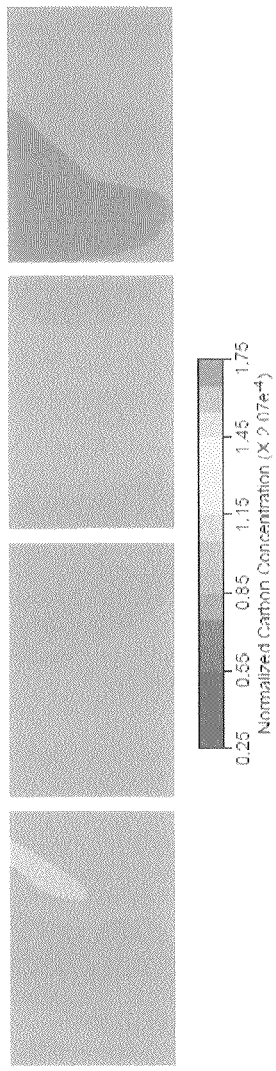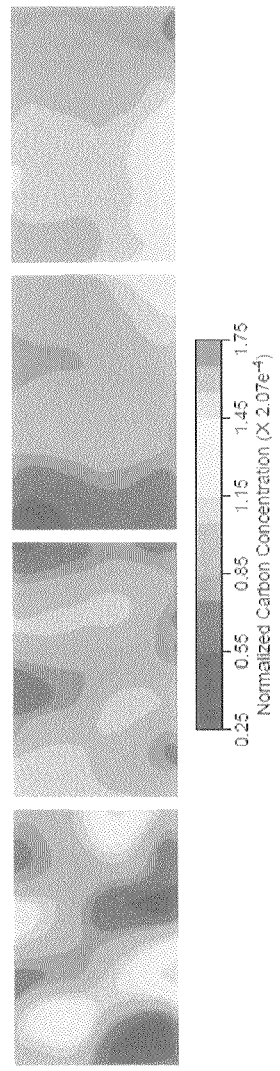
FIGS. 17A AND B

PROCESS TO ENHANCE MIXING OF DRY SORBENTS AND FLUE GAS FOR AIR POLLUTION CONTROL

CROSS REFERENCE TO RELATED APPLICATION

The present application claims the benefits of U.S. Provisional Application Ser. Nos. 61/675,497, filed Jul. 25, 2012, and 61/809,717, filed Apr. 8, 2013, both entitled "PROCESS TO ENHANCE MIXING OF DRY SORBENTS AND FLUE GAS FOR AIR POLLUTION CONTROL", each of which is incorporated herein by this reference in its entirety.

FIELD

The disclosure relates generally to treatment of waste gas and particularly to applying additives to waste gas to remove target contaminants.

BACKGROUND

Increasingly stringent pollution control standards for acid gases and trace air toxics, including hydrochloric acid (HCl), sulfur trioxide ($SO_3$), and mercury (Hg), pose greater challenges for industries. Current best control practices for sorbent pollution control processes, such as activated carbon injection (ACI) and dry sorbent injection (DSI), must be improved. In many cases, a further increase in sorbent injection rate is uneconomical, ineffective, and/or otherwise adversely impacts the waste gas treatment process.

External constraints can also hamper additive or sorbent performance. The effectiveness of in-duct sorbent injection can often be limited due to constraints of duct layout, non-ideal injection locations, sorbent in-flight residence time, temperature, adverse flue gas chemistry, and close proximity to particulate control device.

There is therefore a need for improved methods of sorbent/gas mixing that can be implemented in limited duct space.

SUMMARY

These and other needs are addressed by the various aspects, embodiments, and configurations of the present disclosure. The disclosure is directed to a method and system for enhanced removal of contaminants from coal combustion processes, particularly the use of a static mixing device to provide improved additive distribution in a contaminated gas stream.

The method and system can include:

(a) a thermal unit to combust a contaminated feed material and produce a contaminated gas stream;

(b) an optional air heater to transfer thermal energy from the contaminated gas stream to air prior to introduction of the air into the thermal unit;

(c) an additive injection system to introduce an additive into the contaminated gas stream, the additive controlling a contaminate level (e.g., at least partially removing or causing the removal of the contaminant) in a treated gas stream prior to discharge into the environment;

(d) a static mixing device positioned downstream of the additive injection system to form a mixed gas stream comprising a typically substantially homogeneous distribution of the additive in the mixed gas stream; and (e) a downstream particulate control device to remove particulates (which can include the contaminant and/or a derivative thereof) from the mixed gas stream and from the treated gas stream.

The contaminant can include mercury, and the additive can be one or more of a halogen, halide, and powdered activated carbon.

The contaminant can include one or more of nitrogen oxides ($NO_x$), sulfur oxides (SOx), hydrochloric acid (HCl), hydrogen sulfide, and hydrofluoric acid (HF), and the additive one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

In the mixed gas stream, the distance from an output of the static mixing device to an input of a downstream particulate control device can be at least about one times the hydraulic diameter of the pipe or duct, but is commonly no more than about ten times the hydraulic diameter.

Distance from a point of introduction of the additive into the contaminated gas stream to an input to the static mixing device can be at least about one times the hydraulic diameter but is commonly no more than about ten times the hydraulic diameter.

The static mixing device can include an arrangement of mixing elements in one or more mixing sections. The mixing elements, for instance, can be one or more of static fan-type blades, baffles, and/or plates. The mixing elements can be curved and/or helically shaped. The arrangement of mixing elements commonly includes from about 1 to about 5 static, or substantially stationary and/or fixed, mixing elements.

The additive-containing gas stream can have substantially turbulent flow, and the static mixing device can simultaneously cause flow division and radial mixing in the additive-containing gas stream.

A number of differing process configurations are possible.

The additive, whether an acid gas controlling or mercury capture additive, can be introduced into the contaminated gas stream downstream of an air heater, and the static mixing device can be positioned downstream of both the air heater and the point of introduction of the additive.

The acid gas controlling additive can be an alkaline sorbent, and a mercury capture sorbent can be introduced into the mixed gas stream downstream of the static mixing device.

The alkaline sorbent can be introduced into the contaminated gas stream downstream of a first particulate control device and upstream of a second particulate control device.

The additive can be introduced into the contaminated gas stream upstream of an air heater.

The static mixing device can be positioned upstream of the air heater.

The additive can be an alkaline sorbent, and a mercury capture sorbent can be introduced into the mixed gas stream downstream of the static mixing device and air heater.

The static mixing device can be positioned downstream of the air heater.

The additive can be an alkaline sorbent, and a mercury capture sorbent can be introduced into the mixed gas stream downstream of the static mixing device and air heater.

The additive can include both an alkaline sorbent and a mercury capture sorbent, and both the alkaline and mercury capture sorbents can be introduced into the contaminated gas stream upstream of the static mixing device.

The present disclosure can provide a number of advantages depending on the particular configuration. The disclosed process and system couple a primary sorbent injection process with a downstream stationary static gas mixer having a high degree of mixing effectiveness to achieve a more uniform particle distribution, to eliminate substantially stratification, such as from a vertical temperature gradient, or cause destratification in the gas stream, and to improve contact between gas and sorbent. Typical applications are gas/gas mixing such as ammonia distribution in a Selective Catalytic Reduction or SCR unit. However, in the method and system, the same or similar mixer geometry can achieve substantially uniform particle mixing with gas over a shorter, and often the shortest possible, path. The substantially uniform particle mixing can enhance mass transfer of trace pollutants to the sorbent with a minimal impact on system pressure drop.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid).

Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces) or chemisorption (characteristic of covalent bonding). It may also occur due to electrostatic attraction.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$—$X_n$, $Y_1$—$Y_m$, and $Z_1$—$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Coal" refers to a combustible material formed from prehistoric plant life. Coal includes, without limitation, peat, lignite, sub-bituminous coal, bituminous coal, steam coal, waste coal, anthracite, and graphite. Chemically, coal is a macromolecular network comprised of groups of polynuclear aromatic rings, to which are attached subordinate rings connected by oxygen, sulfur, and aliphatic bridges.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 3 wt. % (dry basis of the coal) while "medium sulfur coals" refer to coals having between about 1.5 and 3 wt. % (dry basis of the coal) and "low sulfur coals" refer to coals having a total sulfur content of less than about 1.5 wt. % (dry basis of the coal).

The "hydraulic diameter" is a commonly used term when handling flow in noncircular tubes and channels. The hydraulic diameter is defined as four times the cross-sectional area of the channel divided by the inside perimeter of the channel.

"Laminar flow" (or streamline flow) occurs when a fluid flows in substantially parallel layers, with little or no disruption between the layers. At low flow velocities, the fluid tends to flow without lateral mixing, and adjacent layers slide past one another like playing cards. There are commonly no cross currents perpendicular to the direction of flow, nor eddies or swirls of fluids. In laminar flow, the motion of the particles of fluid is very orderly with all particles moving in straight lines parallel to the pipe walls. In fluid dynamics, laminar flow is a flow regime characterized by high momentum diffusion and low momentum convection. When a fluid is flowing through a closed channel such as a pipe or between two flat plates, either of two types of flow may occur depending on the velocity of the fluid: laminar flow or turbulent flow. Laminar flow tends to occur at lower velocities, below the onset of turbulent flow.

"Turbulent flow" is a less orderly flow regime that is characterized by eddies or small packets of fluid particles which result in lateral mixing.

"Lime" refers to a caustic alkaline earth metal substance, such as calcium hydroxide ($Ca(OH)_2$), calcium oxide, and mixtures thereof produced by heating limestone.

"Particulate" refers to fine particles, such as fly ash, unburned carbon, contaminate-carrying powdered activated carbon, soot, byproducts of contaminant removal, excess solid additives, and other fine process solids, typically entrained in a mercury-containing gas stream.

"Means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The "Root Mean Square" (RMS) is the square root of the arithmetic mean of the squares of the numbers in a given set of numbers. The RMS percentage (or % RMS) of the distribution of Particle Density in a flow field is typically calculated from the results of a CFD model of a flow field. The % RMS of particle density in a specific plane of the flow field (typically normal to the major flow direction) is equal to the Standard Deviation of the particle density at a discrete number of locations in the plane divided by the Mean of the particle density in the entire plane.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

A "static mixer" is a device for the continuous or substantially continuous mixing of fluid materials. Static mixers can be used to mix liquid and/or gas streams, disperse gas into liquid, or blend immiscible liquids. The energy needed for mixing comes from a loss in pressure as fluids flow through the static mixer. One common design of static mixer is the plate-type mixer. Another common design includes mixer elements contained in a cylindrical (tube) or squared housing. Typical construction materials for static mixer components include stainless steel, polypropylene, Teflon™, polyvinylidene fluoride ("PVDF"), polyvinyl chloride ("PVC"), chlorinated polyvinyl chloride ("CPVC") and polyacetal.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIGS. 13A-B are a prior art depiction of how flow division and radial mixing can occur in a static mixer;

FIGS. 17A and B are plots of PAC density versus position in a duct with and without static mixing, respectively.

It should be understood that the diagrams are provided for example purposes only, and should not be read as limiting the scope of the disclosure. Many other configurations, including multiple sorbent injection points and/or use of multiple static mixers, are fully contemplated and included in the scope of the disclosure.

DETAILED DESCRIPTION

Overview

The current disclosure is directed to an additive introduction system to introduce one or more additives to control contaminant emissions from contaminant evolving facilities, such as smelters, autoclaves, roasters, steel foundries, steel mills, cement kilns, power plants, waste incinerators, boilers, and other contaminated gas stream producing industrial facilities. Although any contaminant may be targeted by the additive introduction system, typical contaminants include acid gases (e.g., sulfur-containing compounds (such as sulfur dioxide and trioxide produced by thermal oxidation of sulfides), nitrogen oxides (such as nitrogen monoxide and dioxide), hydrogen sulfide ($H_2S$), hydrochloric acid (HCl), and hydrofluoric acid (HF)), mercury (elemental and/or oxidized forms), carbon oxides (such as carbon monoxide and dioxide), halogens and halides, particulates (e.g., fly ash particles and other types of unburned carbon), and the like. Although the contaminant is typically evolved by combustion, it may be evolved by other oxidizing reactions, reducing reactions, and other thermal processes such as roasting, pyrolysis, and autoclaving, that expose contaminated materials to elevated temperatures.

Figure 14:
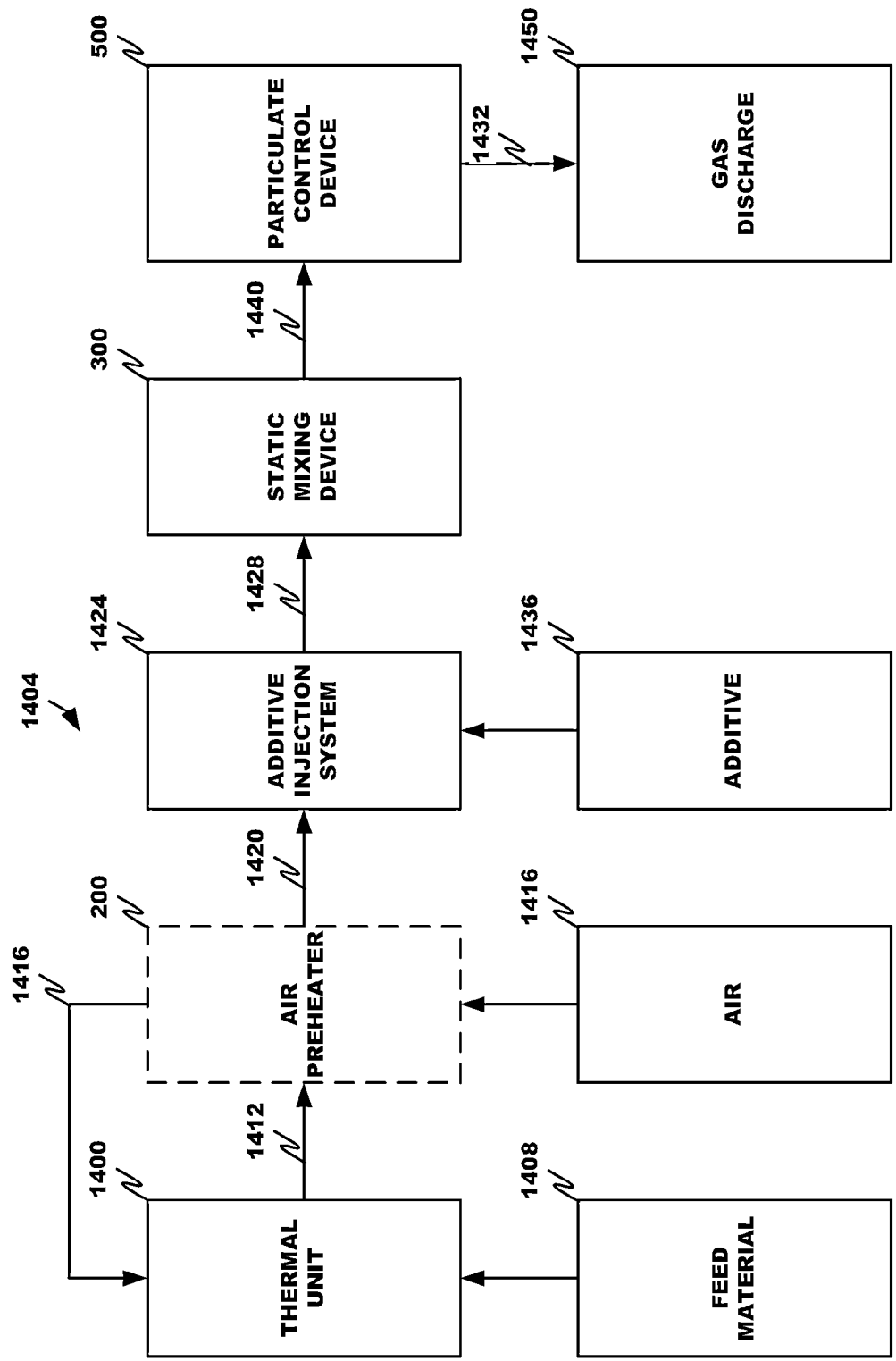
FIG. 14 is a block diagram of according to an embodiment.

FIG. 14 depicts a contaminated gas stream treatment process 1404 for an industrial facility according to an embodiment. Referring to FIG. 14, a contaminated feed material 1408 is provided. In one application, the feed material 1408 is combustible and can be any synthetic or natural, contaminate-containing, combustible, and carbon-containing material, including coal, petroleum coke, and biomass. The feed material 1408 can be a high alkali, high iron, and/or high sulfur coal. In other applications, the present disclosure is applicable to noncombustible, contaminant-containing feed materials, including, without limitation, metal-containing ores, concentrates, and tailings.

The feed material 1408 is heated in thermal unit 1400 to produce a contaminated gas stream 1412. The thermal unit 104 can be any heating device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace, a fluidized bed furnace, arch furnace, and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), or oven.

The contaminated gas stream 1412 generally includes a number of contaminants. A common contaminated gas stream 108 includes mercury, particulates (such as fly ash), sulfur oxides, nitrogen oxides, hydrochloric acid (HCl), other acid gases, carbon oxides, and unburned carbon.

The contaminated gas stream 1412 is optionally passed through the (pre)heater 200 to transfer some of the thermal energy of the contaminated gas stream 1412 to air 1416 prior to input to the thermal unit 1400. The heat transfer produces a common temperature drop in the contaminated gas stream 1420 of from about 500° C. to about 300° C. to produce a cooled contaminated gas stream 1420 temperature commonly ranging from about 100 to about 400° C.

The cooled contaminated gas stream 1420 next passes into the additive injection system 1424, which injects an additive, such as a sorbent, into the cooled contaminated gas stream 1420, to form an additive-containing gas stream 1428. The additive injection system 1424 can be any suitable additive injection system including that described in copending U.S. application Ser. Nos. 13/045,076, filed Mar. 10, 2011, and 13/645,138, filed Oct. 4, 2012, each of which are incorporated fully herein by this reference. Other examples include spray dry and dry injection systems optionally using one or more lances, compressors or pumps, educators, etc. Commonly, the additive is injected through an array of lances positioned upstream of a particulate control device, typically an electrostatic precipitator or fabric filter.

The additive controls emissions of the selected or targeted contaminant in a treated gas stream 1432. Typically, the additive 1436 is entrained in a carrier gas when introduced by additive introduction system 1424. To entrain the additive particles effectively, the additive particles typically have a mean, median, and $P_{90}$ size of no more than about 100 microns and even more typically ranging from about 2 to about 50 microns. The additive-containing fluid (which is mixture of the entrained additive particles and carrier gas) typically includes from about 0.10 to about 6.0 lbm material to lbm air (at standard temperature and pressure).

The additive 1436 employed depends on the contaminant targeted. By way of example, an acid gas controlling sorbent can include an alkaline material, such as (hydrated) lime or an alkaline earth or alkali metal bicarbonate, to control emissions of nitrogen oxides ($NO_x$), sulfur oxides (SOx), hydrochloric acid (HCl), and/or hydrofluoric acid (HF) and an alkaline or alkali metal (e.g., sodium) sesquicarbonate (e.g., trona) to control emissions of sulfur oxides (SOx), hydrogen sulfide ($H_2S$), hydrochloric acid (HCl), and/or hydrofluoric acid (HF). Other acid gas controlling sorbents include metal oxides, such as magnesium oxide or magnesium hydroxide, alkaline earth and alkali metal carbonates, such as sodium carbonate ("soda ash"), and alkaline earth and alkali metal bicarbonates. The byproduct of the reaction between the acid gas controlling sorbent and acid gas is typically a particulate that is removed by a particulate control device. A mercury capture sorbent 400 can include halogens and/or halides. As will be appreciated, halogens and halides can oxidize elemental mercury and the resulting oxidized mercury can be collected on a particulate and/or powdered activated carbon ("PAC") for subsequent removal by a particulate control device. Another mercury capture sorbent 400 is PAC, which can control not only mercury but also a variety of other contaminants, such as gaseous heavy metals dioxins, furans, and hydrocarbons, and which itself is removed as a particulate by a particulate control device. Often, the additive includes both acid gas controlling and mercury capture sorbents. The presence of acid gases can interfere with mercury sorption on carbon-based mercury sorbents. As will be appreciated, other additives may be used depending on the contaminant(s) targeted.

Although the carrier gas for the additive can be any substantially inert gas (relative to the additive), a common carrier gas is air. Typically, the carrier gas includes a minor amount, more typically no more than about 400 $ppm_v$, and even more typically no more than about 390 $ppm_v$ of an additive reactive component, such as carbon dioxide, that reacts with the additive. For example, carbon dioxide reacts with lime to produce calcium carbonate.

The distribution of sorbent is typically non-ideal (non-uniform) in the additive-containing gas stream. An increase in lance coverage of the additive injection system or additional additive injection often fails to provide a more uniform distribution due to mass transfer limitations. For such situations, a fixed (static) gas mixing device installed downstream of additive injection can improve particle distribution without requiring long duct runs and higher plant capital costs.

The additive-containing gas stream 1428 passes a static mixing device 300, which causes additive mixing in the gas stream, thereby providing a mixed gas stream 1440 having, compared to the additive-containing gas stream 1428, an increased uniformity through the gas stream not only of additive distribution but also of temperature and/or velocity profile. This can be true for either single-phase or multiphase gas streams. As will be appreciated, a single-phase gas flow contains multiple gases while a multiphase flow contains at least one gas and at least one particulate solid, typically a sorbent additive.

There are a variety of static mixing devices 300 designed to achieve better gas mixing, temperature de-stratification, and more uniform velocity profile with minimal pressure drop. The static mixing device 300, for example, can be an arrangement of stationary, fixed, and/or static fan-type blades (or mixing elements) that induce turbulence and encourage mixing in the gas stream. The static mixing device 300 can be a plurality of stationary, fixed, and/or static baffles or plates (or mixing elements) on the interior wall of a duct that extend into the duct. The baffles may be straight or curved, and may be offset in the flow direction or in plane. Of course, the static mixing device also may be a combination of these embodiments or any other design that would encourage mixing in the gas stream.

An example of a static mixing device 300 is the Series IV Air Blender™ or Blender Box™ manufactured by Blender Products, Inc. This static mixing device 300 is described in U.S. Pat. No. 6,595,848, which is incorporated herein by this reference. As described in U.S. Pat. No. 6,595,848, the static mixing device has multiple radially extending vanes diverging away from a center of an enclosure and terminating at outer distal ends of the vanes positioned adjacent to the enclosure. The vanes can have an inner section traversing a first distance from the center and an outer section connected to the inner section along a leading radial edge of the vane. The outer section traverses a remaining distance from the inner section to the enclosure. The inner section curves rearwardly in a first direction away from the leading radial edge, and the outer section curves rearwardly in a second direction away from the leading radial edge.

The static mixing device 300 typically is a housed-elements design in which the static mixer elements include a series of stationary, fixed, rigid, and/or static mixing elements made of metal, ceramic, and/or a variety of materials stable at the temperature of the contaminated gas stream. Similarly, the mixing device housing, which is commonly the duct for transporting the contaminated waste gas, can be made of the same materials. Two streams of fluids, namely the contaminated gas stream and the injected sorbent stream are introduced into the static mixing device 300. As the streams move through the mixing device, the non-moving or stationary mixing elements continuously blend the components of the streams to form a mixed gas stream having a substantially homogeneous composition. Complete mixing commonly depends on many variables including the fluids' properties, tube inner diameter, number of elements and their design.

The mixing elements, particularly when helically-shaped, can simultaneously produce patterns of flow division and radial mixing. With reference to FIG. 13, the static mixing device 300 can effect flow division and/or radial mixing. With respect to FIG. 13A, flow division can occur in the mixed gas stream. In laminar flow, a gas stream 1300 can divide, as shown by the gas flow arrows, at the leading edge of each mixing element 1304 of the mixing device 300 and follow the channels created by the mixing element 1304 shape (which is curved or arcuate in FIG. 13A). With respect to FIG. 13B, radial mixing can, alternatively or additionally, occur in the mixed gas stream. In either turbulent flow or laminar flow, rotational circulation 1308 of the gas stream around its hydraulic center in each channel of the mixing device can cause radial mixing of the gas stream. The gas stream is commonly intermixed to reduce or eliminate radial gradients in temperature, velocity and/or gas stream composition. In most applications, the gas stream will have non-laminar or turbulent flow.

Figure 12:
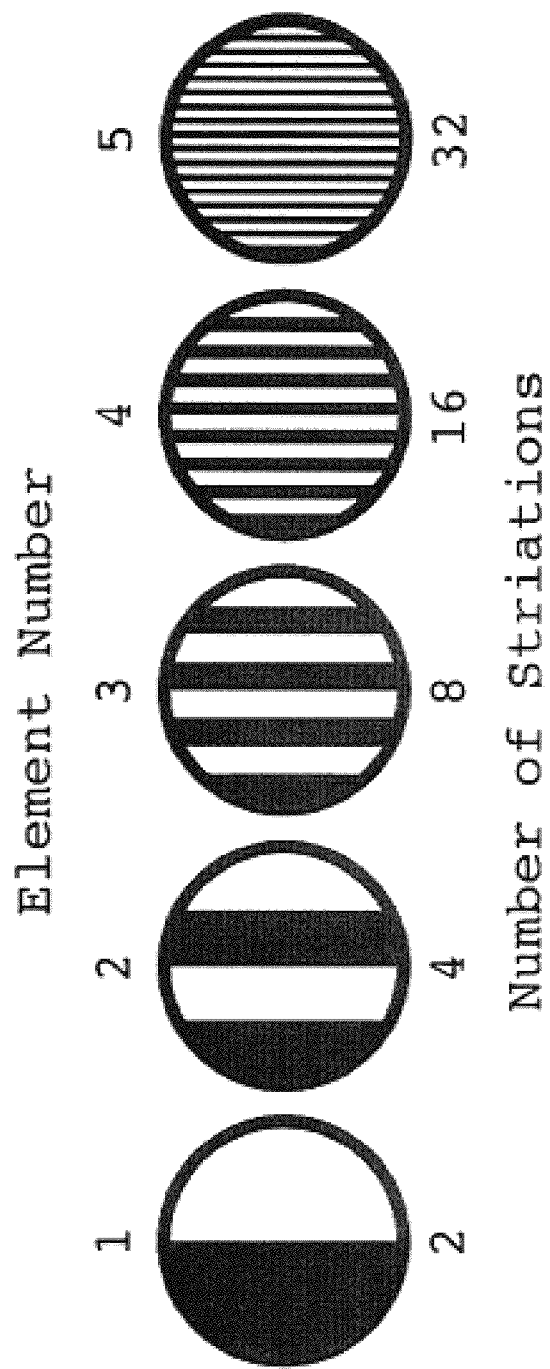
FIG. 12 is a prior art depiction of the dependency of flow division in a static mixer to the number of baffles or mixing elements in the static mixer.

With reference to FIG. 12, flow division in a static mixer using baffles as mixing elements is a function of the number of mixing elements in the mixing device. At each succeeding mixing element 1304, the two channels can be further divided, resulting in an exponential increase in stratification. The number of striations normally produced is $2^n$ where 'n' is the number of mixing elements 1304 in the mixing device. As shown by FIG. 12, the number of flow striations is two for one mixing element, four for two mixing elements, eight for three mixing elements, sixteen for four mixing elements, and thirty-two for five mixing elements.

In most applications, the additive-containing gas stream 1428, at the input to the mixing device, has laminar flow, and the number of mixing elements in the static mixing device 300 is typically at least one, more typically at least two, and even more typically ranges from about 2 to about 25. Both flow division and radial mixing normally occur in power plant flue gas treatment applications. In such applications, the flue gas velocity typically ranges from about 5 to about 50 m/s and more typically from about 12 to about 20 m/s for a power plant. In other applications, the additive-containing gas stream 1428, at the input to the mixing device, has turbulent flow, and only radial mixing (and substantially no flow division) occurs.

The static mixing device 300 is typically positioned a distance upstream of the particulate removal device to allow adequate mixing and contaminant-additive particle interaction and a distance downstream of the point(s) of additive injection by the additive injection system 1424 to allow time for adequate dispersion of the additive particles in the gas stream. In the mixed gas stream, the distance from an output of the static mixing device to an input of a downstream particulate control device can be at least about one times the hydraulic diameter of the pipe or duct. While determined by the configuration of the power plant, the maximum distance from the output of the static mixing device to the input of the particulate control device is commonly no more than about ten times the hydraulic diameter. The distance from a point of introduction of the additive into the contaminated gas stream to an input to the static mixing device can be at least about one times the hydraulic diameter. While determined by the configuration of the power plant, the maximum distance from the point of introduction of the additive into the contaminated gas stream to the input to the static mixing device is commonly no more than about ten times the hydraulic diameter.

Referring again to FIG. 14, the mixed gas stream 1440 passes through particulate control device 500 to remove most of the particulates (and targeted contaminant and/or derivatives thereof) from the mixed gas stream 1440 and form a treated gas stream 1432. The particulate control device 500 can be any suitable device, including a wet or dry electrostatic precipitator, particulate filter such as a baghouse, wet particulate scrubber, and other types of particulate removal device.

The treated gas stream 1432 is emitted, via gas discharge 1450 (e.g., stack), into the environment.

Exemplary Process Configurations

A number of exemplary configurations of the above process will now be discussed with reference to FIGS. 1-11.

Figure 1:
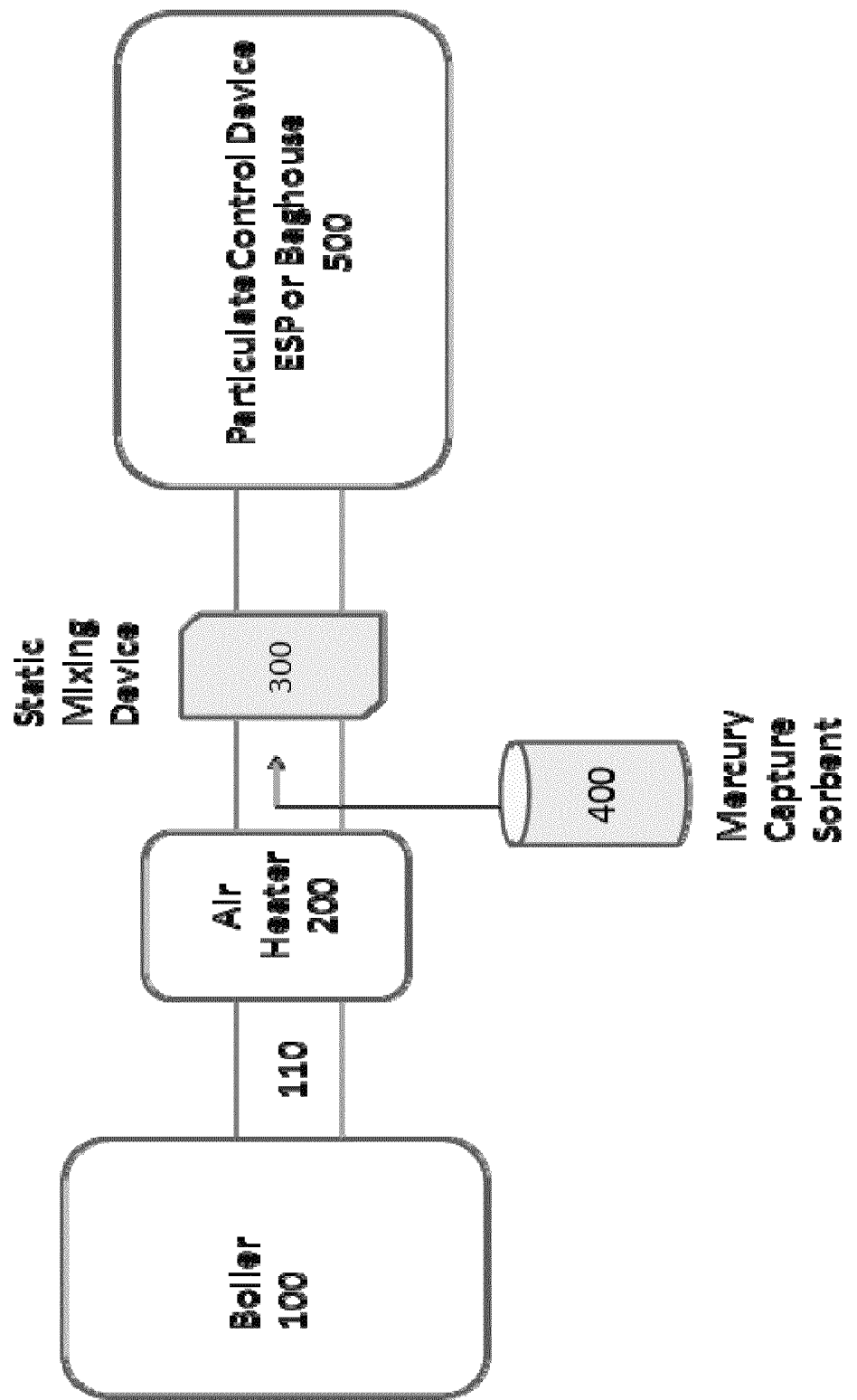
FIG. 1 is a block diagram according to a first embodiment of the disclosure.

FIG. 1 depicts a process in which a mercury capture sorbent is injected at an injection location upstream of the static mixing device 300. Referring to FIG. 1, a boiler 100 combusts a combustible feed material, such as coal, and generates a mercury and acid gas-containing gas stream 110. The static mixer 300 is placed in the flow stream of the mercury and acid gas-containing gas stream 110. In this configuration, the static mixing device 300 is positioned downstream of the injection location of a sorbent 400 injected by the additive injection system (not shown). The injected sorbent 400 can be a mercury capture sorbent, such as a halogen or halogenated compound or halogen impregnated sorbent particle, such as halogenated activated carbon. The injected sorbent 400 combines with mercury in the mercury and acid gas-containing gas stream 110 and forms mercury-containing particulates. A particulate control device 500 then removes at least some, and typically most, of the mercury-containing and other particulates from the mercury and acid gas-containing gas stream 110.

Figure 2:
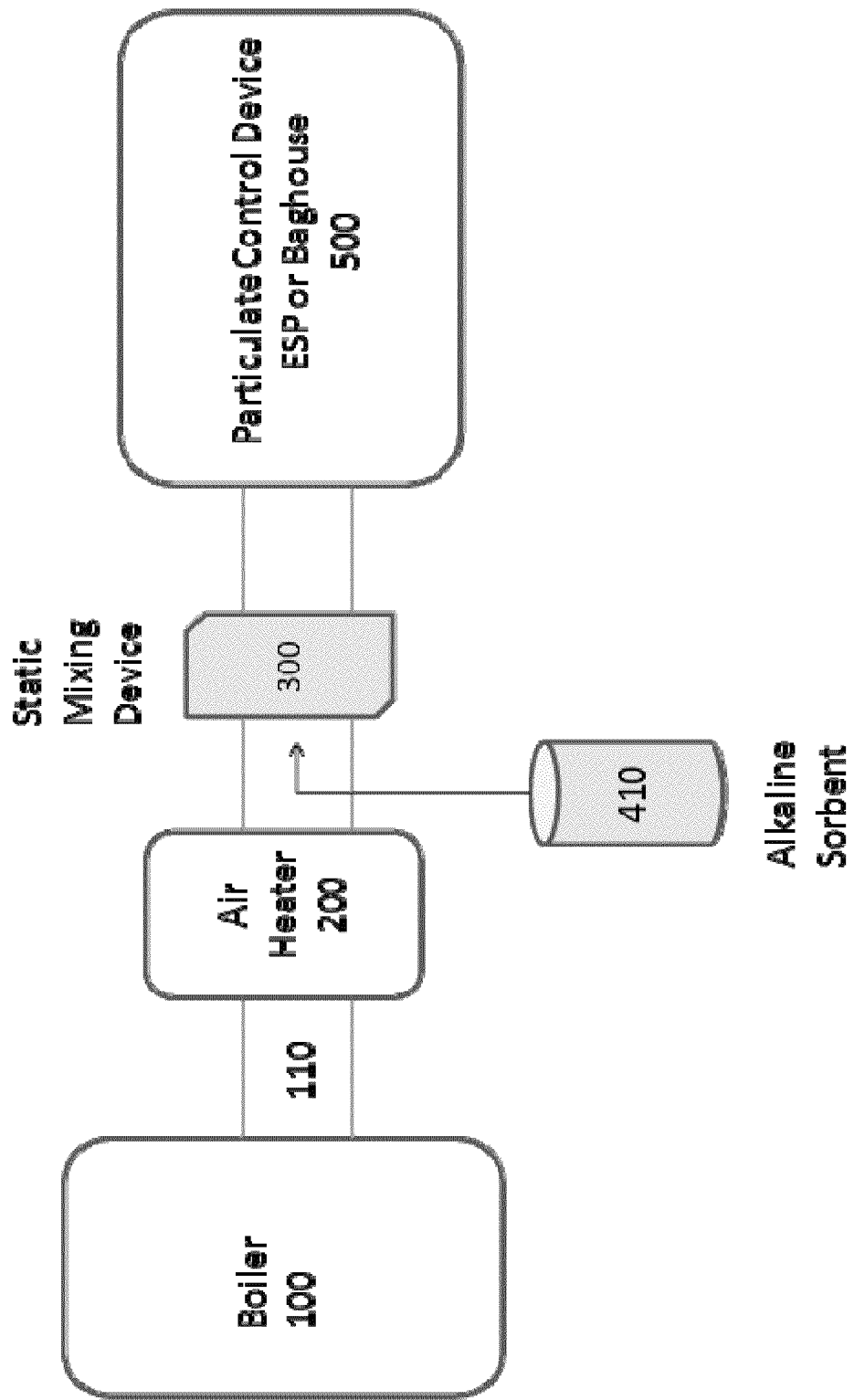
FIG. 2 is a block diagram according to another embodiment.

FIG. 2 depicts a process in which an acid gas-controlling sorbent, such as an alkaline sorbent 410, is injected at an injection location upstream of the static mixing device 300. Referring to FIG. 2, the boiler 100 combusts the combustible feed material and generates the mercury and acid gas-containing gas stream 110. The static mixing device 300 is positioned in the flow stream of the mercury and acid gas-containing gas stream 110. In this configuration, the static mixing device 300 is placed downstream of the injection location of a sorbent 410 injected by the additive injection system (not shown). In one aspect of this configuration, the injected sorbent 410 is an alkaline sorbent. As noted above, the sorbent 410 can be any other acid-controlling sorbent or mixture of acid gas-controlling sorbents. The injected sorbent 410 reacts with or otherwise reduces the concentration of $SO_3$ or other acid gases in the mercury and acid gas-containing gas stream 110. In this configuration, carbonaceous materials in the mercury and acid gas-containing gas stream 110, such as fly ash, may combine with the mercury in the mercury and acid gas-containing gas stream 110 due to the lower concentrations of $SO_3$. The particulate control device 500 then removes at least some, and typically most, of the mercury containing and other particulates (such as the byproducts of acid gas removal) from the mercury and acid gas-containing gas stream 110.

Figure 3:
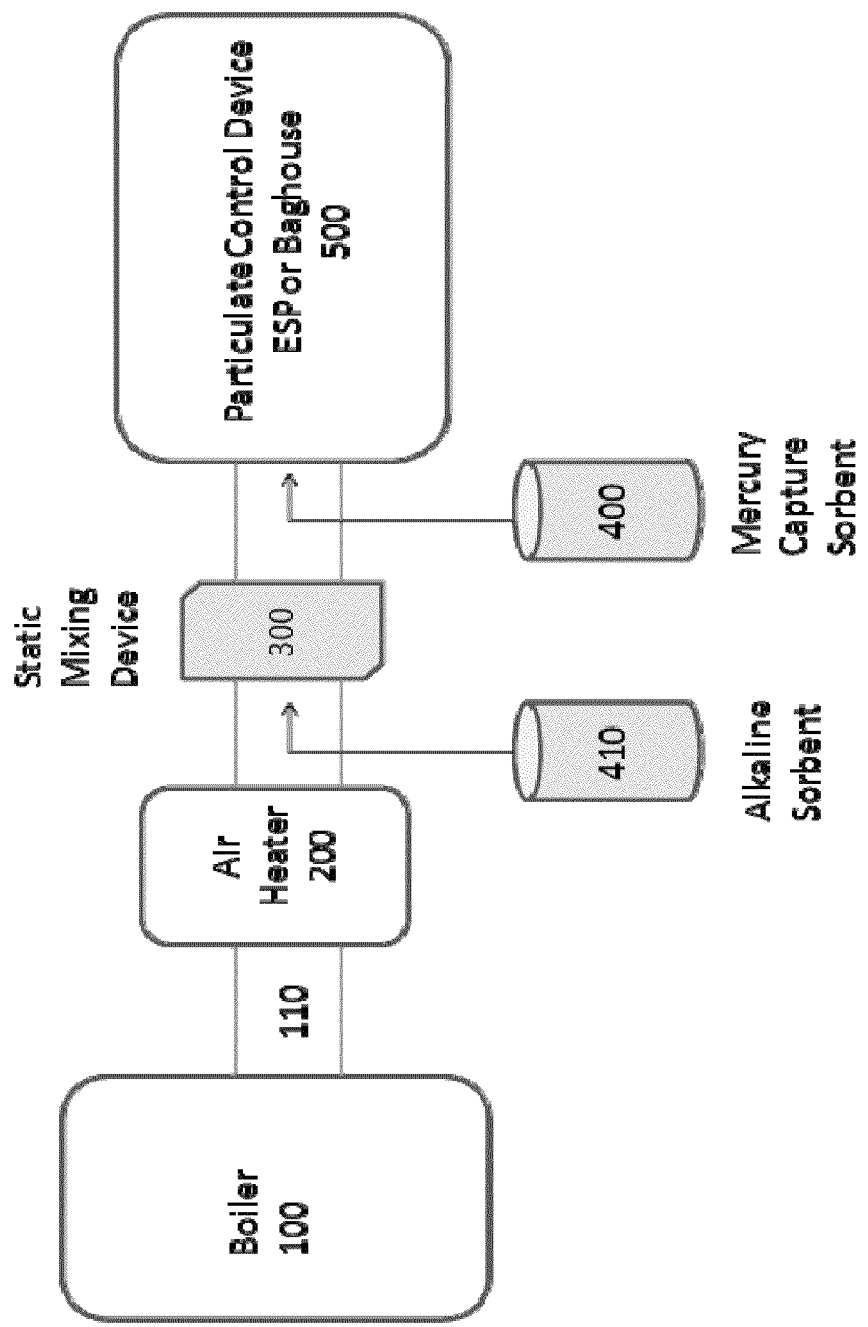
FIG. 3 is a block diagram according to another embodiment.

FIG. 3 illustrates a process in which an acid gas-controlling sorbent, such as an alkaline sorbent 410, is injected at an injection location upstream of the static mixing device 300 and a mercury capture sorbent is injected at an injection location downstream of the static mixing device 300. Referring to FIG. 3, the boiler 100 combusts the combustible feed material and generates a mercury and acid gas-containing gas stream 110. The static mixer 300 is placed in the flow stream of the mercury and acid gas-containing gas stream 110. In this configuration, the static mixer 300 is placed in the mercury and acid gas-containing gas stream 110 between the injection location of a first sorbent 410 injected by the additive injection system (not shown) and the injection location of a second sorbent 400 injected by the additive injection system (not shown). Preferably, the first injected sorbent 410 is an alkaline sorbent to react with one or more acid gases, and the second injected sorbent 400 is a mercury capture sorbent. As noted above, the sorbent 410 can be any other acid-controlling sorbent or mixture of acid gas-controlling sorbents. The first injected sorbent 410 reacts with or otherwise reduces the concentration of $SO_3$ or other acid gases in the mercury and acid gas-containing gas stream. These acid gases could potentially interfere with the second injected sorbent's 400 ability to combine with or otherwise capture mercury. The second injected sorbent 400 then combines with mercury in the mercury and acid gas-containing gas stream 110 and forms mercury containing particulates. The particulate control device 500 then removes at least some, and typically most, of the mercury-containing and other particulates (such as the byproducts of acid gas removal) from the mercury and acid gas-containing gas stream 110.

Figure 4:
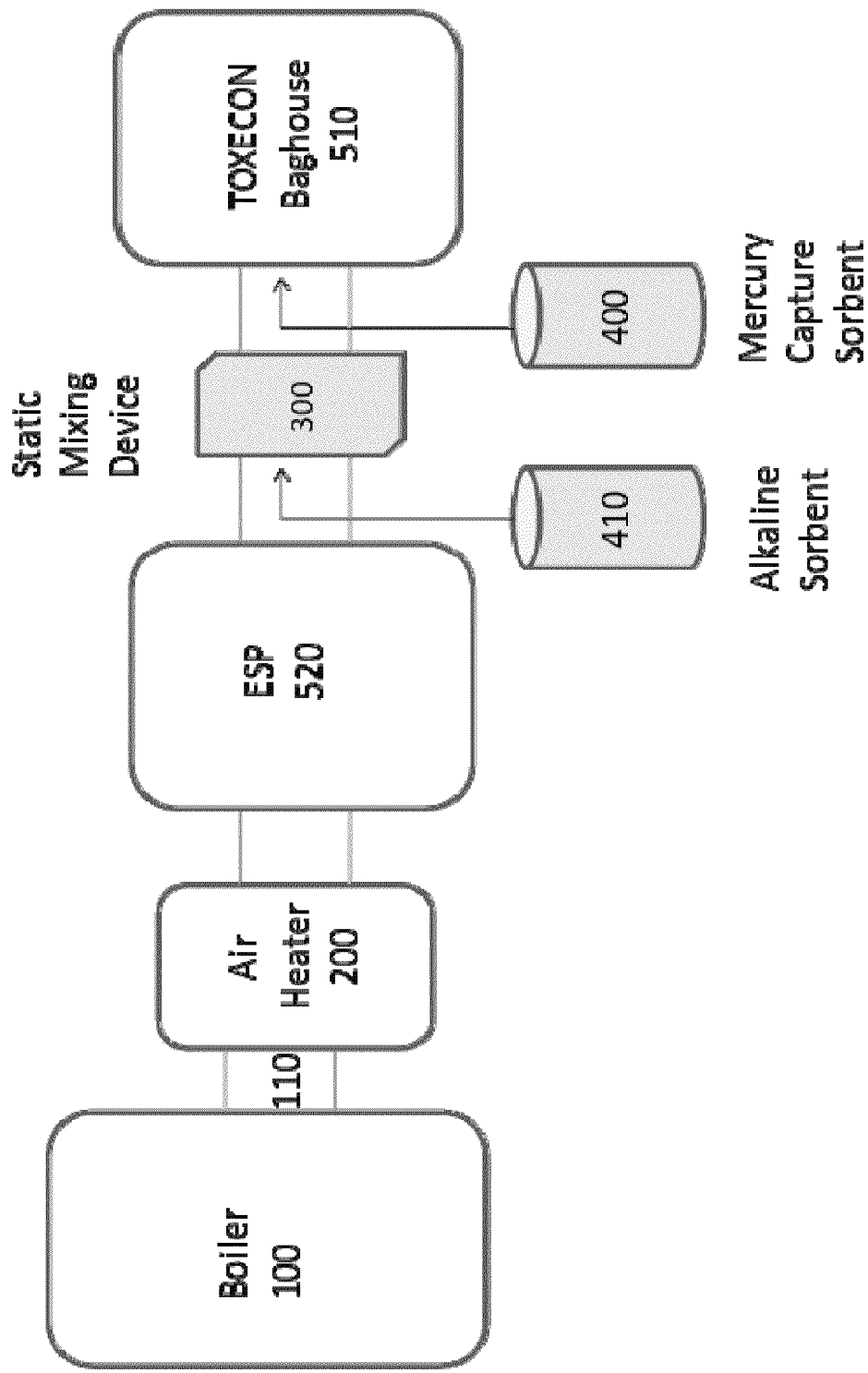
FIG. 4 is a block diagram according to another embodiment.

FIG. 4 depicts a process in which an acid gas-controlling sorbent, such as an alkaline sorbent 410, is injected at an injection location upstream of the static mixing device 300, a mercury capture sorbent is injected at an injection location downstream of the static mixing device 300, and an electrostatic precipitator ("ESP") 520 is located downstream of the air heater 200 and upstream of the static mixing device 300 and the sorbent injection locations. In this embodiment, the particulate collection device is typically a TOXECON baghouse 510. Referring to FIG. 4, the boiler 100 combusts the combustible feed material and generates a mercury and acid gas-containing gas stream 110. The static mixing device 300 is placed in the flow stream of the mercury and acid gas-containing gas stream 110. In this configuration, the static mixing device 300 is placed in the mercury and acid gas-containing gas stream 110 between the location of injection by the additive injection system (not shown) of a first injected sorbent 410 and the location of injection by the additive injection system (not shown) of a second injected sorbent 400. Preferably, the first injected sorbent 410 is an alkaline sorbent, and the second injected sorbent 400 is a mercury capture sorbent. As noted above, the sorbent 410 can be any other acid-controlling sorbent or mixture of acid gas-controlling sorbents. The first injected sorbent 410 reacts with or otherwise reduces the concentration of $SO_3$ or other acid gases in the mercury and acid gas containing gas stream. The second injected sorbent 400 then combines with mercury in the mercury and acid gas-containing gas stream 110 and forms mercury-containing particulates. In one aspect of this configuration, the ESP 520 is downstream of the air heater 200 and upstream of each of the following: the injection location of the first injected sorbent 410, the static mixing device 300, and the injection location of the second injected sorbent 400. In another aspect of this configuration, alkaline sorbent and mercury containing particles are collected with a TOXECON baghouse 510. The TOXECON baghouse 510 removes at least some, and typically most, of the mercury-containing and other particulates (such as the byproducts of acid gas removal) from the mercury and acid gas-containing gas stream 110.

In a preferred embodiment, the static mixing device 300 will be utilized in combination with Dry Sorbent Injection ("DSI")/Activated Carbon Injection ("ACI") dual injection. In this configuration, the static mixing device 300 is placed in the mercury and acid gas-containing gas stream 110 between the location of injection by the additive injection system (not shown) of a first injected sorbent 410 and the location of injection by the additive injection system (not shown) of a second injected sorbent 400. In this configuration, the first injected sorbent 410 is an alkaline sorbent, and the second injected sorbent 400 is activated carbon. As noted above, the sorbent 410 can be any other acid-controlling sorbent or mixture of acid gas-controlling sorbents. This embodiment will allow for maximal utilization of alkaline material and reduction of acid gases such as $SO_3$ prior to activated carbon injection for mercury control. Ultimately, this can reduce sorbent usage for a given sorbent injection rate, thereby reducing operating costs and/or achieving maximal combined removal of acid gases and mercury.

FIGS. 5 through 11 demonstrate additional embodiments of the disclosure. These embodiments demonstrate potential configurations applying a static mixing device 300 to hot-side sorbent injection applications. As will be appreciated, "hot side" refers to a location upstream of the air (pre)heater 200. Typical contaminated gas stream temperatures upstream of the air (pre)heater 200 are at least about 300° C. and more typically range from about 350 to about 450° C. and downstream of the air (pre)heater 200 are no more than about 250° C. and more typically range from about 120 to about 200° C.

Figure 5:
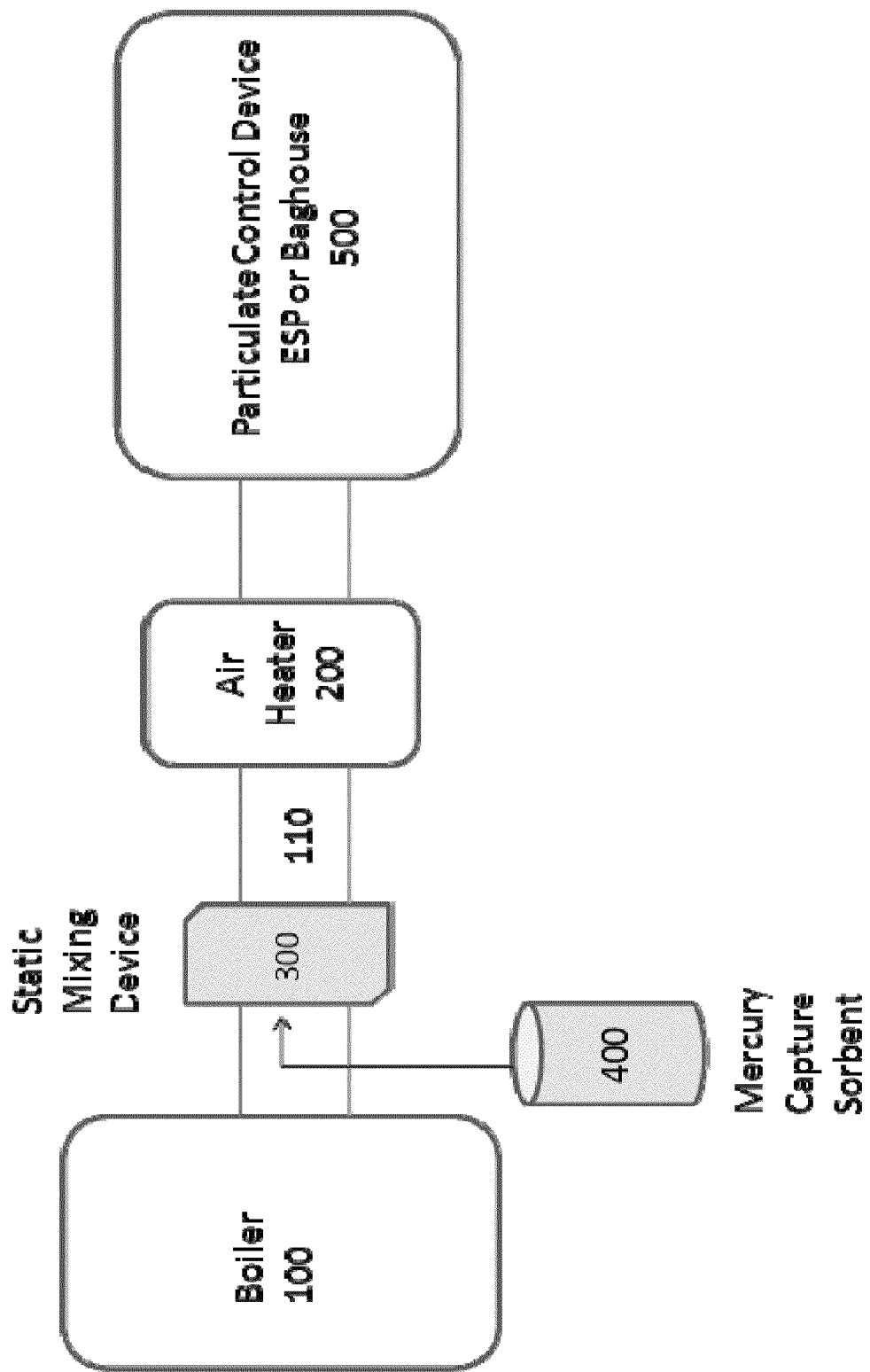
FIG. 5 is a block diagram according to another embodiment.

FIG. 5 shows injection of a mercury capture sorbent 400 upstream of both the static mixing device 300 and the air (pre)heater 200 (which is located downstream of the static mixing device 300). The particulate control device 500 then removes at least some, and typically most, of the mercury-containing and other particulates (such as the byproducts of acid gas removal) from the mercury and acid gas-containing gas stream 110.

Figure 6:
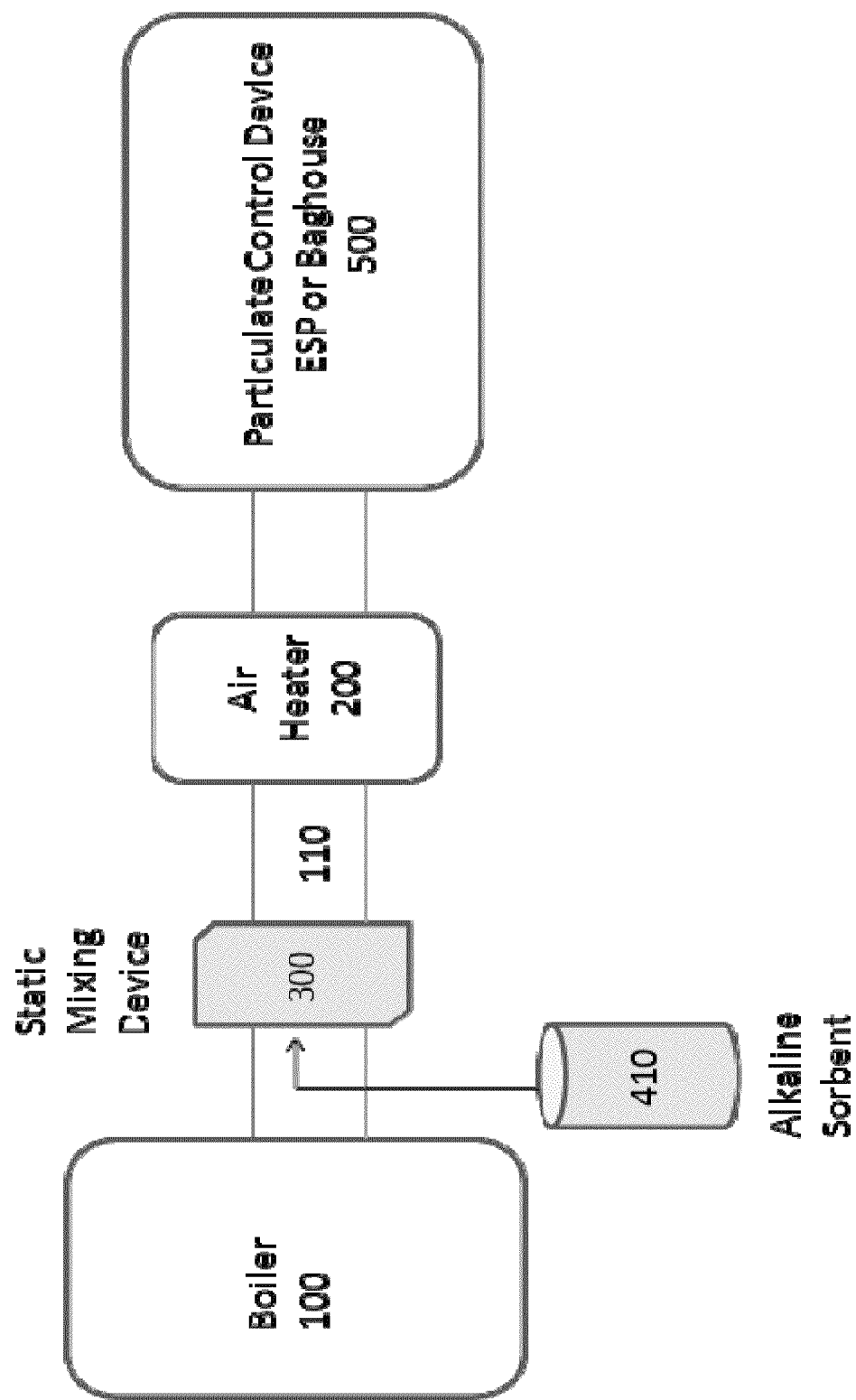
FIG. 6 is a block diagram according to yet another embodiment.

FIG. 6 shows injection of an acid gas controlling sorbent, such as an alkaline sorbent 410, upstream of both the static mixing device 300 and the air (pre)heater 200 (which is located downstream of the static mixing device 300). The particulate control device 500 then removes at least some, and typically most, of the particulates (such as the byproducts of acid gas removal) from the mercury and acid gas-containing gas stream 110.

Figure 7:
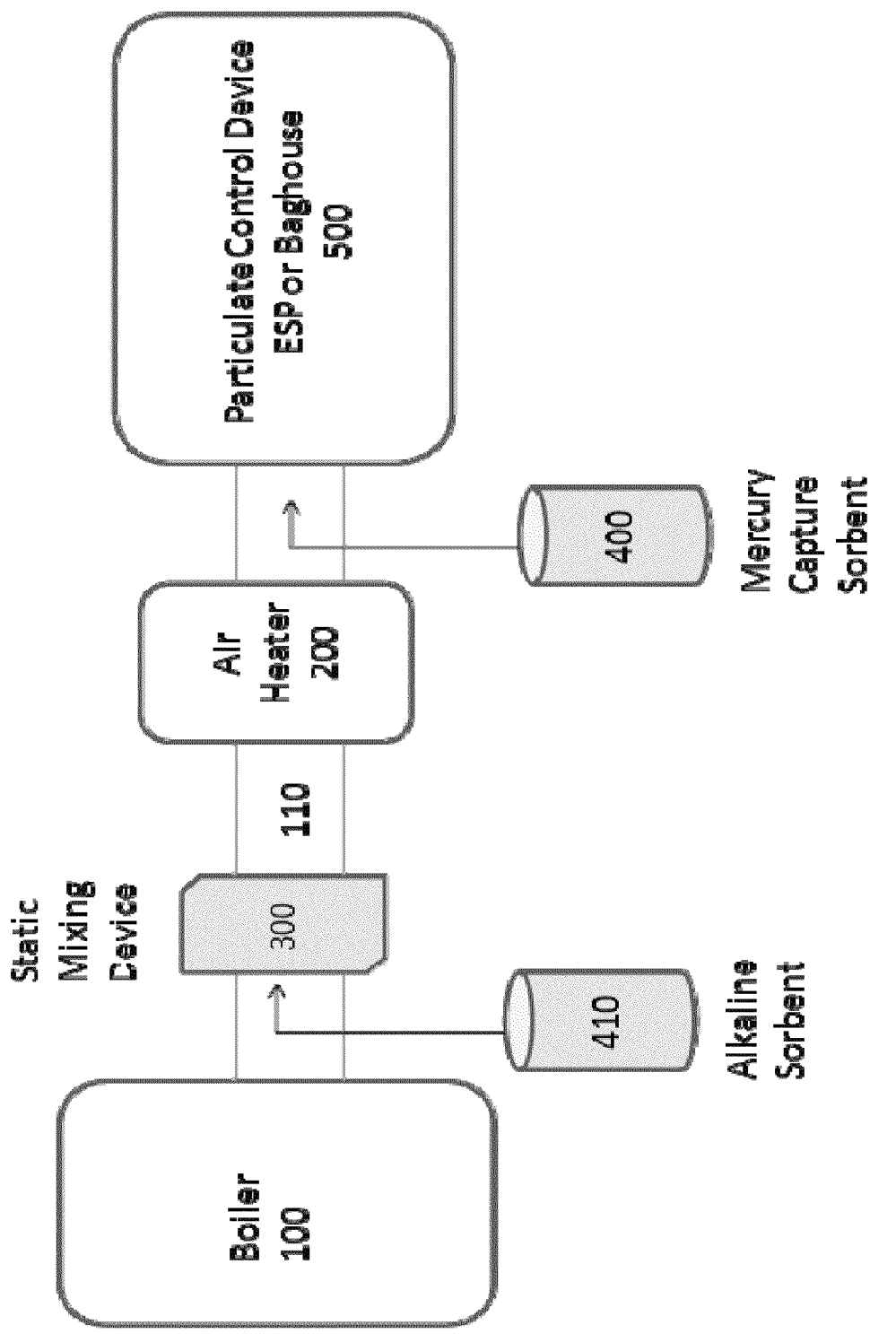
FIG. 7 is a block diagram according to yet another embodiment.

FIG. 7 shows injection of an acid gas controlling sorbent, such as an alkaline sorbent 410, upstream of the air (pre)heater 200 and static mixing device 300 (which is also positioned upstream of the air (pre)heater 200 and of a mercury capture sorbent 400 downstream of the air (pre)heater and static mixing device 300 but upstream of the particulate control device 500. The particulate control device 500 then removes at least some, and typically most, of the mercury-containing and other particulates (such as the byproducts of acid gas removal) from the mercury and acid gas-containing gas stream 110.

Figure 8:
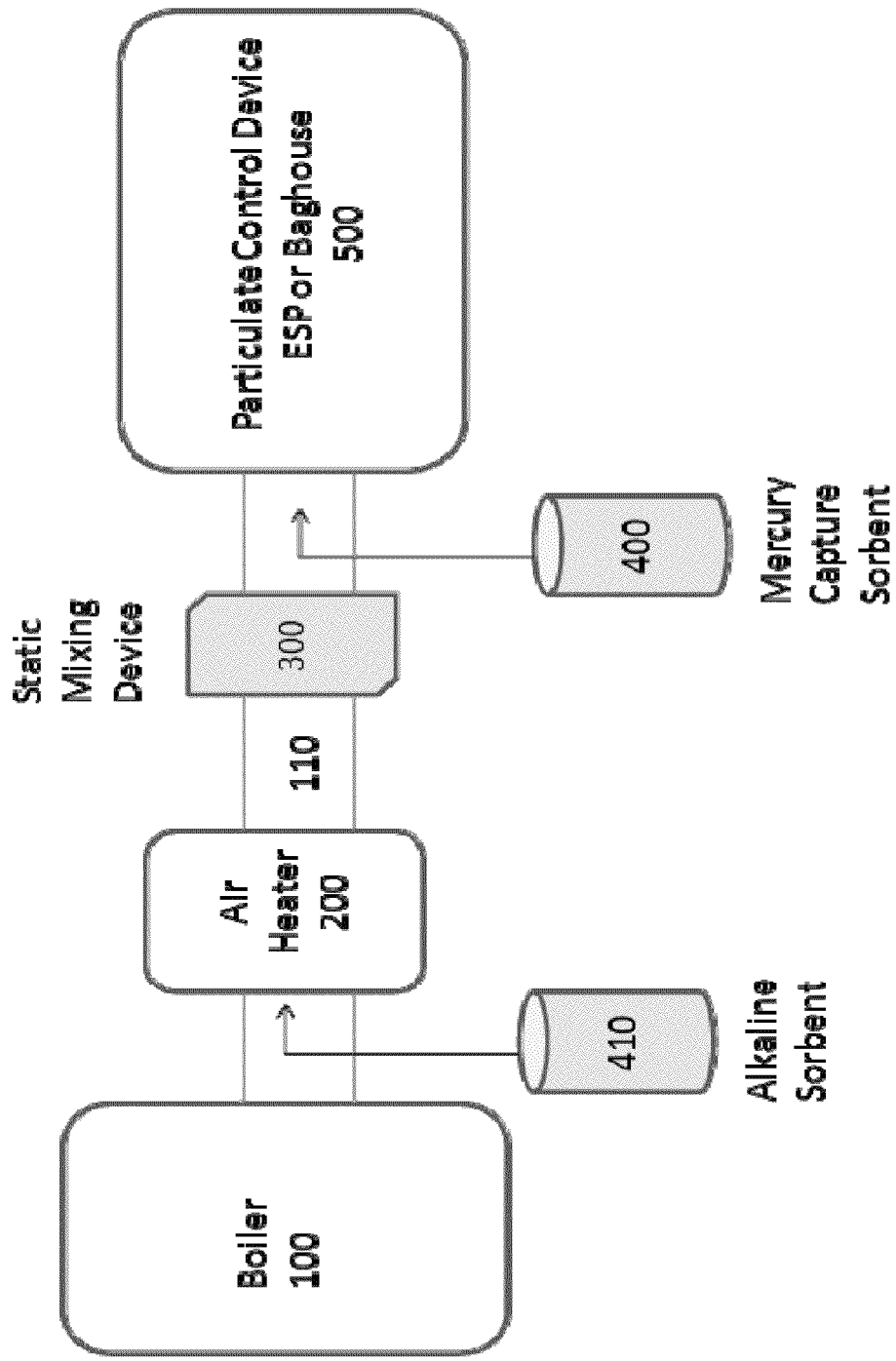
FIG. 8 is a block diagram according to yet another embodiment.

FIG. 8 shows injection of an acid gas controlling sorbent, such as an alkaline sorbent 410, upstream of the air (pre)heater 200 and static mixing device 300 (which is positioned downstream of the air (pre)heater 200 (or on the cold-side) and of a mercury capture sorbent 400 downstream of the air (pre)heater and static mixing device 300 but upstream of the particulate control device 500. The particulate control device 500 then removes at least some, and typically most, of the mercury-containing and other particulates (such as the byproducts of acid gas removal) from the mercury and acid gas-containing gas stream 110.

Figure 9:
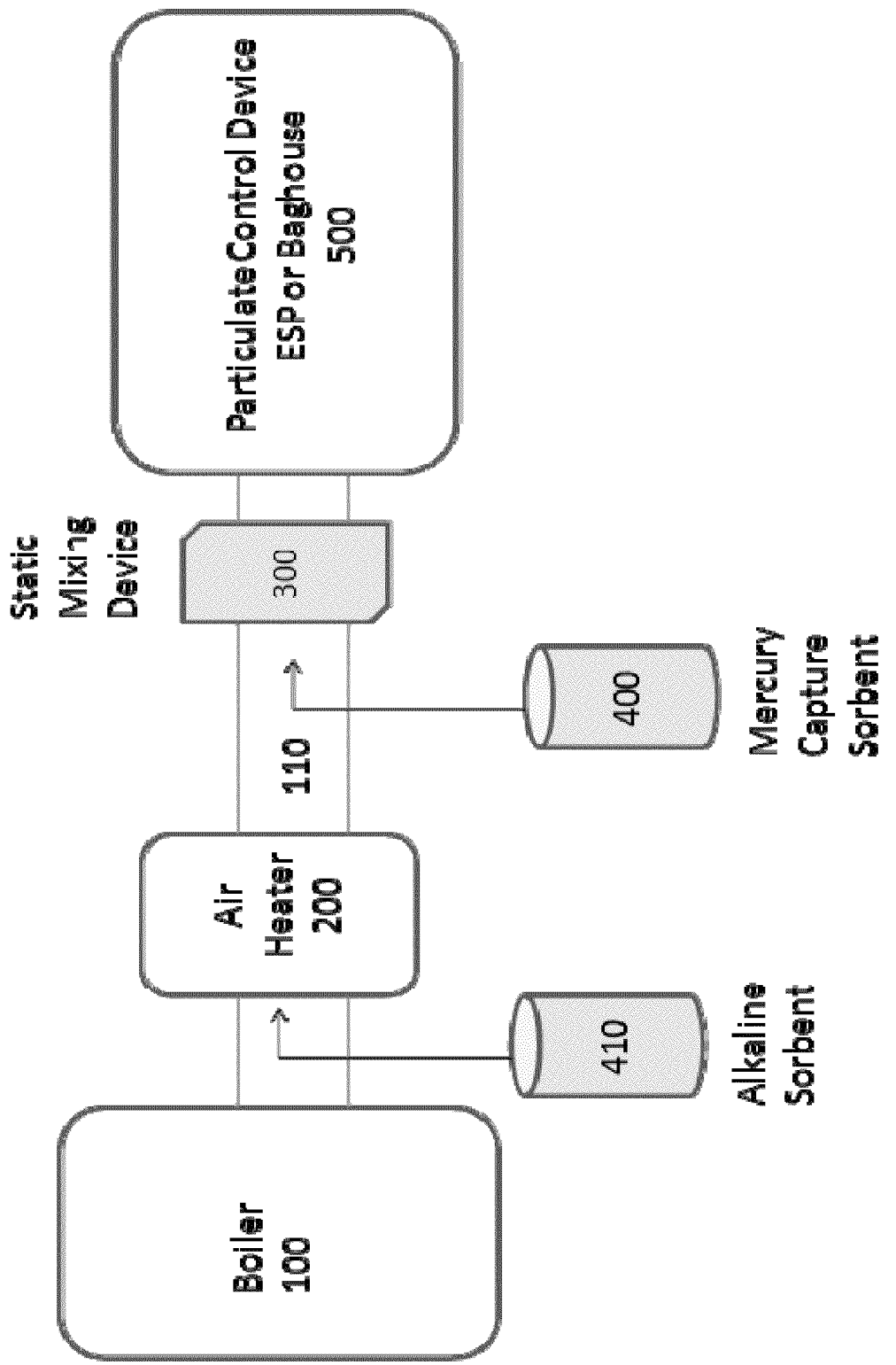
FIG. 9 is a block diagram according to yet another embodiment.

FIG. 9 shows injection of an acid gas controlling sorbent, such as an alkaline sorbent 410, upstream of the air (pre)heater 200 and static mixing device 300 (which is positioned downstream of the air (pre)heater 200 (or on the cold-side) and of a mercury capture sorbent 400 downstream of the air (pre)heater 200 and upstream of the static mixing device 300 and the particulate control device 500. The particulate control device 500 then removes at least some, and typically most, of the mercury-containing and other particulates (such as the byproducts of acid gas removal) from the mercury and acid gas-containing gas stream 110.

Figure 10:
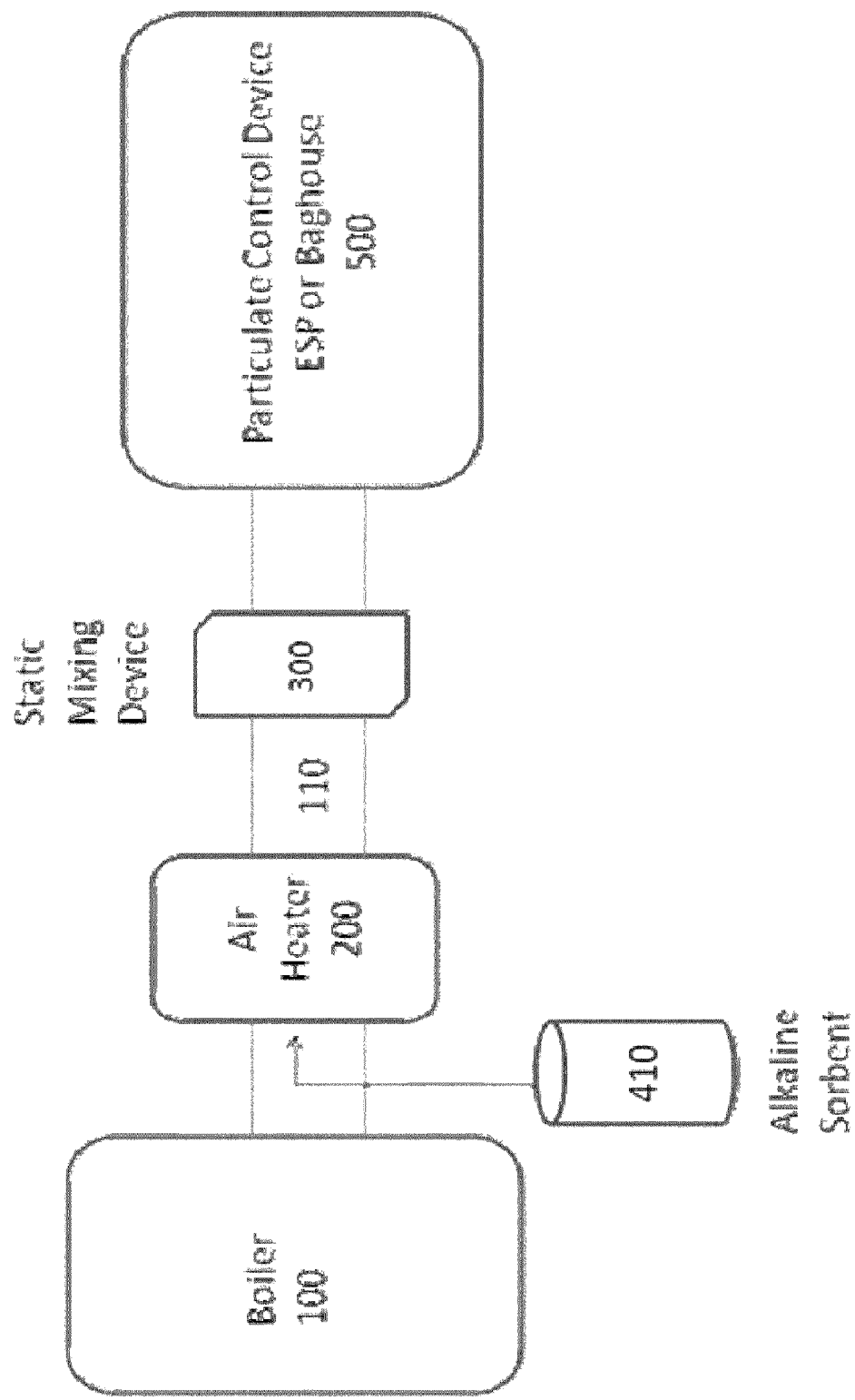
FIG. 10 is a block diagram according to yet another embodiment.

FIG. 10 shows injection of an acid gas controlling sorbent, such as an alkaline sorbent 410, upstream of both the static mixing device 300 and the air (pre)heater 200 (which is located upstream of the static mixing device 300). The particulate control device 500 then removes at least some, and typically most, of the particulates (such as the byproducts of acid gas removal) from the mercury and acid gas-containing gas stream 110.

Figure 11:
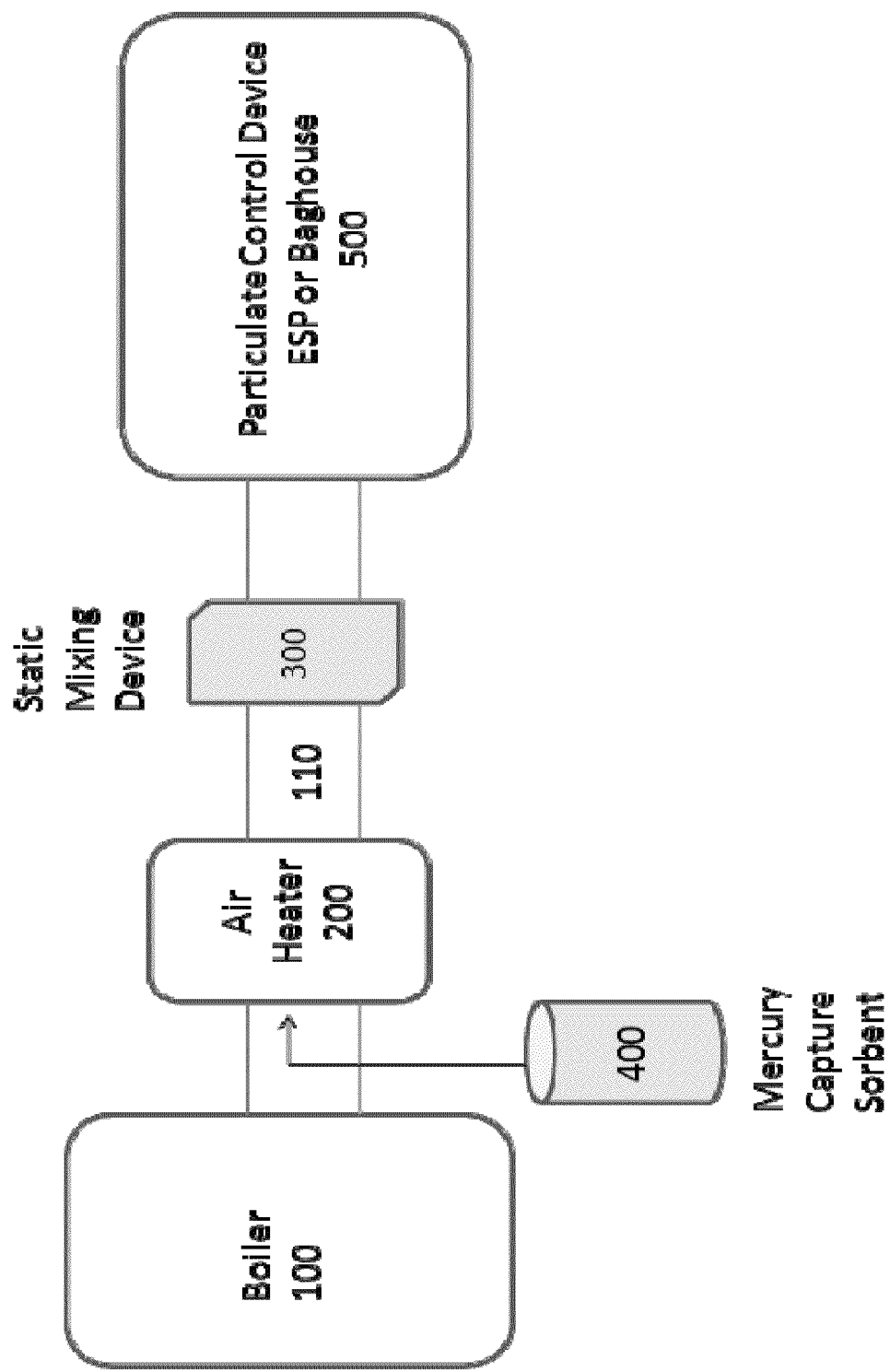
FIG. 11 is a block diagram according to yet another embodiment.

FIG. 11 shows injection of a mercury capture sorbent 400 upstream of both the static mixing device 300 and the air (pre)heater 200 (which is located upstream of the static mixing device 300). The particulate control device 500 then removes at least some, and typically most, of the mercury-containing and other particulates (such as the byproducts of acid gas removal) from the mercury and acid gas-containing gas stream 110.

Not shown, but contemplated by the disclosure, are additional configurations utilizing hot-side injection of one or more sorbents and a hot-side ESP (or other particulate removal device), with the static mixing device 300 placed in between. The static mixing device 300 may be helpful with hot-side injection applications, that is, applications where a sorbent is injected upstream of the air (pre)heater 200. While such configurations generally benefit from increased residence time and the associated improvement in sorbent distribution, the static mixing device 300 can contribute an even more complete sorbent distribution.

With any hot-side sorbent injection application, the static mixing device 300 could be placed either upstream or downstream of the air (pre)heater. Typically, the plant configuration will dictate the appropriate location. Variables include length of flow path available, requirements for distribution of the sorbent or velocity and temperature profiles, and location of the particulate control device (including hot-side or cold-side ESP).

Further contemplated is the use of a static mixing device 300 with other wet or dry sorbents (e.g., wet flue gas desulfurization additives), that were not specifically named in this disclosure, including sorbents applied to the fuel and sorbents injected into the furnace in any of a gas, liquid, or solid phase. Although the disclosure specifically targets dry sorbent (including activated carbon and DSI) injection, it is contemplated that use of a static mixing device 300 would further improve uniformity of distribution for these sorbents, as a well as offering uniformity benefits to velocity and temperature profiles of the resulting contaminated gas stream.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Figure 15:
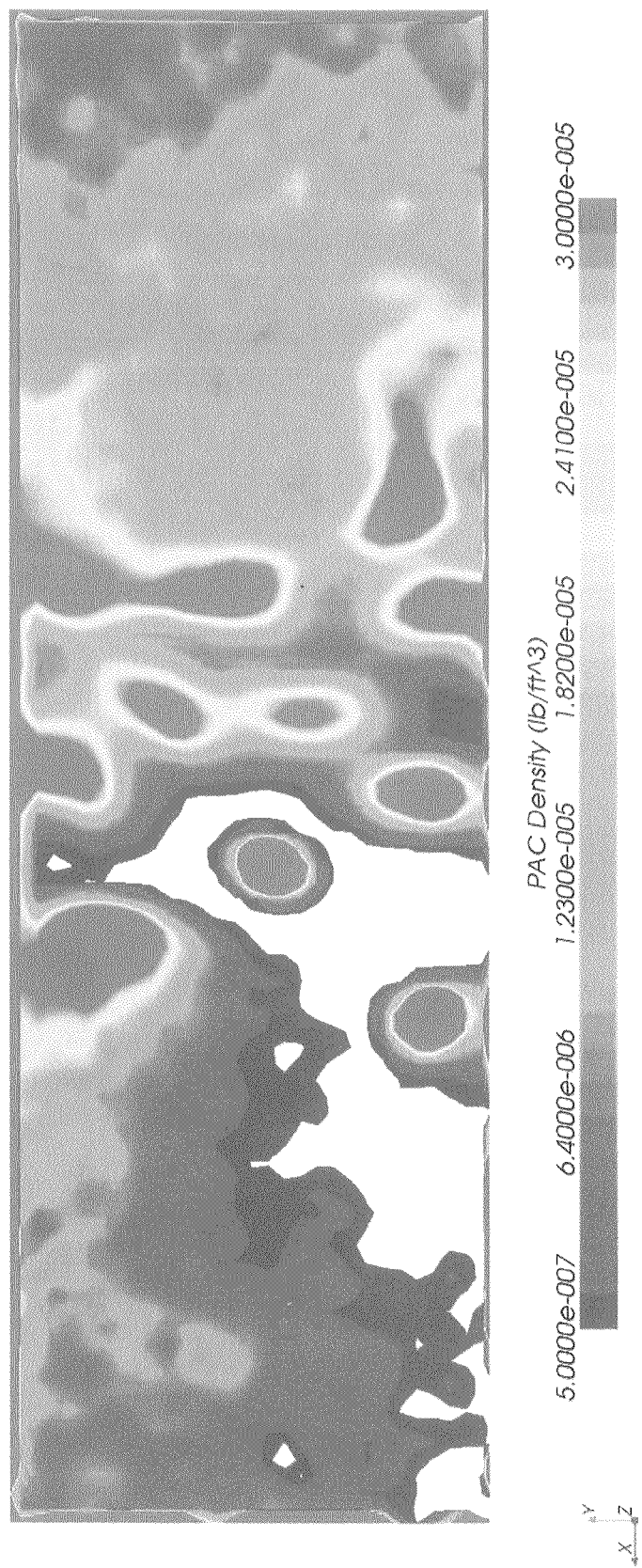
FIG. 15 is a plot of powered activated carbon density ("PAC") versus position in a duct in the absence of static mixing.
Figure 16:
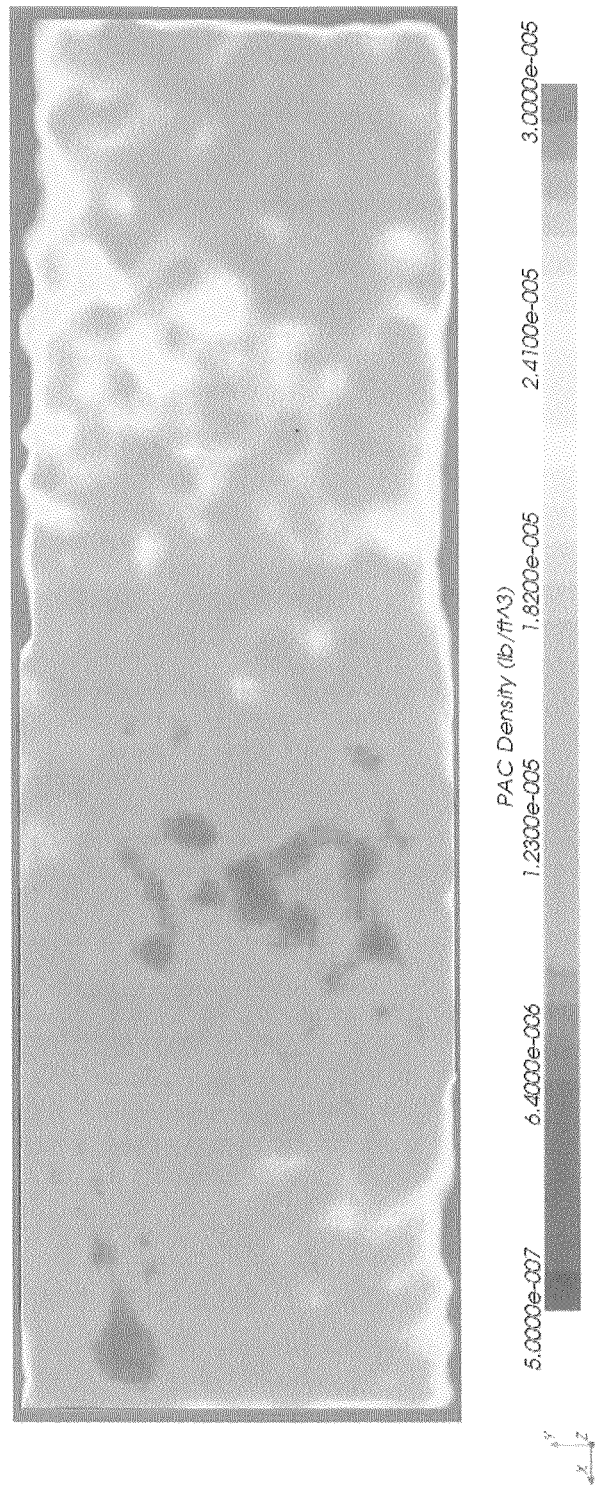
FIG. 16 is a plot of PAC versus position in a duct with static mixing.

FIGS. 15 and 16 show CFD modeling results of a power plant. The scalar represents PAC density at the inlet of the particulate control device (which is an ESP) and without a static mixer. Boundary conditions and feed rates are identical in both bases. The CFD results at the particulate control device inlet are summarized as follows:

|  | Without Static Mixer | With Static Mixer |
| --- | --- | --- |
| RMS | 117% | 31% |

The calculation model inlet flue gas velocity was approximately 20 ft/sec. The static mixer was located about 1.73 hydraulic diameters upstream of the particulate control device.

FIGS. 17A-B show CFD modeling of a different power plant. The scalar represents normalized carbon concentration at the inlet of an ESP with and without a static mixer. Boundary conditions and feed rates are identical in both cases. The CFD results at the particulate control device inlet are as summarized for four equal side-by-side areas:

|  | Without Mixer | | | | With Mixer | | | |
| --- | --- | --- | --- | --- | --- | --- | --- | --- |
| ACI concentration RMS | 23% | 10% | 7% | 9% | 6% | 4% | 3% | 8% |

The flue gas velocity prior to the mixer was approximately 70 ft/s (21 m/s). The mixer was located about 5.2 hydraulic diameters upstream of the particulate control device (distance from the mixer to the center of the ESP inlet).

A number of variations and modifications of the disclosure can be used. It would be possible to provide for some features of the disclosure without providing others.

For example, while ESP and baghouse particulate control devices are discussed with reference to particulate removal, one or more other or alternative particulate and/or contaminant removal devices can be employed as particulate control devices, such as wet and/or dry scrubbers.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   introducing an additive to a contaminated gas stream to form an additive-containing gas stream, the additive at least partially removing or causing the removal of the contaminant;
   passing the contaminated gas stream through an air heater to transfer thermal energy from the contaminated gas stream to air prior to introduction of the air into the thermal unit;
   passing the additive-containing gas stream through a static mixing device, positioned in the gas stream, to form a mixed gas stream, wherein energy for mixing by the static mixing device is from a loss in pressure as the additive-containing gas stream flows through the static mixing device; and
   removing, by a particulate control device, particulates from the mixed gas stream, wherein the particulates comprise at least some of the contaminant and/or a derivative thereof.

2. A method, comprising:
   introducing an additive to a contaminated gas stream to form an additive-containing gas stream, the additive at least partially removing or causing the removal of the contaminant;
   passing the additive-containing gas stream through a static mixing device, positioned in the gas stream, to form a mixed gas stream, wherein energy for mixing by the static mixing device is from a loss in pressure as the additive-containing gas stream flows through the static mixing device; and
   removing, by a particulate control device, particulates from the mixed gas stream, wherein the particulates comprise at least some of the contaminant and/or a derivative thereof, wherein the at least one contaminant comprises mercury, and wherein the additive is one or more of a halogen, halide, and powdered activated carbon.

3. A method, comprising:
   introducing an additive to a contaminated gas stream to form an additive-containing gas stream, the additive at least partially removing or causing the removal of the contaminant;
   passing the additive-containing gas stream through a static mixing device, positioned in the gas stream, to form a mixed gas stream; and
   removing, by a particulate control device, particulates from the mixed gas stream, wherein the particulates comprise at least some of the contaminant and/or a derivative thereof and wherein the at least one contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

4. A method, comprising:

introducing an additive to a contaminated gas stream to form an additive-containing gas stream, the additive at least partially removing or causing the removal of the contaminant;

passing the additive-containing gas stream through a static mixing device, positioned in the gas stream, to form a mixed gas stream, wherein energy for mixing by the static mixing device is from a loss in pressure as the additive-containing gas stream flows through the static mixing device; and removing, by a particulate control device, particulates from the mixed gas stream, wherein the particulates comprise at least some of the contaminant and/or a derivative thereof and wherein a distance from an output of the static mixing device to an input of the downstream particulate control device is at least about one times the hydraulic diameter of a conduit positioned between the static mixing device and particulate control device.

5. The method of claim 1, wherein the static mixing device comprises an arrangement of substantially stationary mixing elements that induce turbulence in the additive-containing gas stream, wherein the mixing elements are one or more of static fan-type blades, baffles, and/or plates, wherein the additive-containing gas stream has substantially non-laminar flow, and wherein the static mixing device simultaneously causes flow division and radial mixing in the additive-containing gas stream.

6. The method of claim 5, wherein the mixing elements are curved and/or helically shaped, wherein the mixing elements are stationary and/or non-moving, wherein the static mixing device has from about 2 to about 25 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

7. A method, comprising:

introducing an additive to a contaminated gas stream to form an additive-containing gas stream, the additive at least partially removing or causing the removal of the contaminant;

passing the additive-containing gas stream through a static mixing device, positioned in the gas stream, to form a mixed gas stream, wherein energy for mixing by the static mixing device is from a loss in pressure as the additive-containing gas stream flows through the static mixing device; and removing, by a particulate control device, particulates from the mixed gas stream, wherein the particulates comprise at least some of the contaminant and/or a derivative thereof and wherein a distance from a point of introduction of the additive into the contaminated gas stream to an input to the static mixing device is at least about one times the hydraulic diameter of a conduit positioned between the point of introduction and the input.

8. A method, comprising:

introducing an additive to a contaminated gas stream to form an additive-containing gas stream, the additive at least partially removing or causing the removal of the contaminant;

passing the additive-containing gas stream through a static mixing device, positioned in the gas stream, to form a mixed gas stream, wherein energy for mixing by the static mixing device is from a loss in pressure as the additive-containing gas stream flows through the static mixing device; and removing, by a particulate control device, particulates from the mixed gas stream, wherein the particulates comprise at least some of the contaminant and/or a derivative thereof, wherein the additive is introduced into the contaminated gas stream downstream of an air heater, and wherein the static mixing device is positioned downstream of both the air heater and the point of introduction of the additive.

9. The method of claim 8, wherein the additive is an alkaline sorbent and wherein a mercury capture sorbent is introduced into the mixed gas stream downstream of the static mixing device.

10. The method of claim 9, wherein the alkaline sorbent is introduced into the contaminated gas stream downstream of a first particulate control device and upstream of a second particulate control device.

11. The method of claim 1, wherein the additive is introduced into the contaminated gas stream upstream of an air heater, wherein the mixing elements are stationary and/or non-moving, wherein the static mixing device has from about 2 to about 25 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

12. The method of claim 11, wherein the static mixing device is positioned upstream of the air heater, wherein the mixing elements are stationary and/or non-moving, wherein the static mixing device has from about 2 to about 25 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

13. The method of claim 12, wherein the additive is an alkaline sorbent and wherein a mercury capture sorbent is introduced into the mixed gas stream downstream of the static mixing device and air heater.

14. The method of claim 11, wherein the static mixing device is positioned downstream of the air heater.

15. The method of claim 12, wherein the additive is an alkaline sorbent and wherein a mercury capture sorbent is introduced into the mixed gas stream downstream of the static mixing device and air heater.

16. A method, comprising:

introducing an additive to a contaminated gas stream to form an additive-containing gas stream, the additive at least partially removing or causing the removal of the contaminant;

passing the additive-containing gas stream through a static mixing device, positioned in the gas stream, to form a mixed gas stream, wherein energy for mixing by the static mixing device is from a loss in pressure as the additive-containing gas stream flows through the static mixing device; and removing, by a particulate control device, particulates from the mixed gas stream, wherein the particulates comprise at least some of the contaminant and/or a derivative thereof, wherein the additive comprises both an alkaline sorbent and a mercury capture sorbent, and wherein both the alkaline and mercury capture sorbents are introduced into the contaminated gas stream upstream of the static mixing device.

17. A method, comprising:
introducing an additive to a contaminated gas stream to form an additive-containing gas stream, the additive at least partially removing or causing the removal of the contaminant;
passing the additive-containing gas stream through a static mixing device, positioned in the gas stream, to form a mixed gas stream, wherein energy for mixing by the static mixing device is from a loss in pressure as the additive-containing gas stream flows through the static mixing device; and
removing, by a particulate control device, particulates from the mixed gas stream, wherein the particulates comprise at least some of the contaminant and/or a derivative thereof, wherein the static mixing device comprises an arrangement of substantially stationary mixing elements that induce turbulence in the additive-containing gas stream, wherein the mixing elements are one or more of static fan-type blades, baffles, and/or plates, wherein the additive-containing gas stream has substantially non-laminar flow, and wherein the static mixing device simultaneously causes flow division and radial mixing in the additive-containing gas stream, and wherein the arrangement of mixing elements comprises from about 1 to about 5 mixing elements.

18. A contaminated gas treatment system, comprising:
a thermal unit to combust a contaminated feed material and produce a contaminated gas stream;
an air heater to transfer thermal energy from the contaminated gas stream to air prior to introduction of the air into the thermal unit;
an additive injection system to introduce an additive into the contaminated gas stream, the additive controlling a contaminate level in a treated gas stream prior to discharge of the treated gas stream into the environment;
a static mixing device positioned downstream of the additive injection system to form a mixed gas stream comprising a substantially homogeneous distribution of the additive in the mixed gas stream, wherein energy for mixing by the static mixing device is from a loss in pressure as the additive-containing gas stream flows through the static mixing device; and
a downstream particulate control device to remove particulates from the mixed gas stream and form the treated gas stream.

19. The system of claim 18, wherein a distance from an output of the static mixing device to an input of the downstream particulate control device is at least about one times the hydraulic diameter of a conduit positioned between the static mixing device and particulate control device.

20. The system of claim 18, wherein the static mixing device comprises an arrangement of substantially rigid and stationary mixing elements that induce turbulence in the additive-containing gas stream, wherein the mixing elements are one or more of static fan-type blades, baffles, and/or plates, wherein the additive-containing gas stream has substantially non-laminar flow, wherein the arrangement of mixing elements comprises from about 1 to about 25 mixing elements, and wherein the static mixing device simultaneously causes flow division and radial mixing in the additive-containing gas stream.

21. The system of claim 20, wherein the mixing elements are curved and/or helically shaped, wherein the mixing elements are stationary and/or non-moving, wherein the static mixing device has from about 2 to about 5 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

22. The system of claim 18, wherein a distance from a point of introduction of the additive into the contaminated gas stream to an input to the static mixing device is at least about one times the hydraulic diameter of a conduit positioned between the point of introduction and the input.

23. The system of claim 18, wherein the additive is introduced into the contaminated gas stream downstream of the air heater, wherein the static mixing device is positioned downstream of both the air heater and the point of introduction of the additive, wherein the mixing elements are stationary and/or non-moving, wherein the static mixing device has from about 2 to about 25 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

24. The system of claim 23, wherein the additive is an alkaline sorbent and wherein a mercury capture sorbent is introduced into the mixed gas stream downstream of the static mixing device.

25. The system of claim 24, wherein the alkaline sorbent is introduced into the contaminated gas stream downstream of a first particulate control device and upstream of the downstream particulate control device.

26. The system of claim 18, wherein the additive is introduced into the contaminated gas stream upstream of the air heater.

27. The system of claim 26, wherein the static mixing device is positioned upstream of the air heater, wherein the mixing elements are stationary and/or non-moving, wherein the static mixing device has from about 2 to about 25 mixing elements, wherein a flue gas velocity of the additive-containing gas stream ranges from about 5 to about 50 m/s, wherein the static mixing device is positioned upstream from the particulate control device, and wherein the distance is from about one to about ten times a hydraulic diameter of a duct carrying the mixed gas stream.

28. The system of claim 27, wherein the additive is an alkaline sorbent and wherein a mercury capture sorbent is introduced into the mixed gas stream downstream of the static mixing device and air heater.

29. The system of claim 26, wherein the static mixing device is positioned downstream of the air heater.

30. The system of claim 26, wherein the additive is an alkaline sorbent and wherein a mercury capture sorbent is introduced into the mixed gas stream downstream of the static mixing device and air heater.

31. The system of claim 18, wherein the additive comprises both an alkaline sorbent and a mercury capture sorbent and wherein both the alkaline and mercury capture sorbents are introduced into the contaminated gas stream upstream of the static mixing device.

32. The system of claim 20, wherein the arrangement of mixing elements comprises from about 1 to about 5 mixing elements.

33. The method of claim 1, wherein the contaminant comprises one or more of nitrogen oxides ($NO_x$), sulfur oxides (SOx), hydrochloric acid (HC1), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

34. The method of claim 2, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

35. The method of claim 4, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

36. The method of claim 7, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

37. The method of claim 8, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

38. The method of claim 16, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

39. The method of claim 17, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

40. The system of claim 18, wherein the contaminant comprises one or more of nitrogen oxides ($NO_x$), sulfur oxides (SOx), hydrochloric acid (HCl), hydrogen sulfide, and hydrofluoric acid (HF) and wherein the additive is one or more of lime, an alkaline earth metal sesquicarbonate, an alkali metal sesquicarbonate, a metal oxide, an alkaline earth metal carbonate, an alkali earth metal carbonate, an alkaline earth metal bicarbonate, and an alkali earth metal bicarbonate.

\* \* \* \* \*